US010969460B2

(12) United States Patent
Martin

(10) Patent No.: US 10,969,460 B2
(45) Date of Patent: Apr. 6, 2021

(54) METHOD FOR RADIO TOMOGRAPHIC IMAGE FORMATION

(71) Applicant: Government of the United States, as represented by the Secretary of the Air Force, Wright-Patterson AFB, OH (US)

(72) Inventor: Richard K Martin, Springboro, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/459,915

(22) Filed: Jul. 2, 2019

(65) Prior Publication Data
US 2019/0324112 A1 Oct. 24, 2019

Related U.S. Application Data

(63) Continuation of application No. 15/040,585, filed on Feb. 10, 2016, now Pat. No. 10,386,449.

(51) Int. Cl.
*G01S 3/02* (2006.01)
*G01S 5/02* (2010.01)
*G01S 5/14* (2006.01)

(52) U.S. Cl.
CPC .............. *G01S 5/0252* (2013.01); *G01S 5/02* (2013.01); *G01S 5/14* (2013.01); *G01S 5/021* (2013.01); *G01S 5/0221* (2013.01)

(58) Field of Classification Search
CPC . G01S 5/08; G01S 5/06; G01S 5/0221; G01S 5/04; G01S 5/021; G01S 5/0252; G01S 5/14; G01C 21/22
(Continued)

(56) References Cited

U.S. PATENT DOCUMENTS 7,817,838 B2 10/2010 DiBella et al.
8,314,796 B2 * 11/2012 Pratx .................. A61B 6/508
345/424
(Continued)

FOREIGN PATENT DOCUMENTS

EP 2653106 A1 10/2013

OTHER PUBLICATIONS

Adler et al., "Device-Free Indoor Localisation Using Radio Tomography Imaging in 800/900 MHz Band," 2014 International Conference on Indoor Positioning and Indoor Navigation (Oct. 2014).
Wilson et al., "Radio Tomographic Imaging Wireless Networks," IEEE Transactions on Mobile Computing, vol. 9, No. 5, pp. 621-632 (May 2010).
(Continued)

*Primary Examiner* — Chuong P Nguyen
(74) *Attorney, Agent, or Firm* — AFMCLO/JAZ; Jeffrey V. Bamber

(57) ABSTRACT

A method for generating radio tomographic images is provided. A plurality of transceivers positioned around a region to be imaged is divided into a plurality of pixels. A control apparatus is configured to cause each of the plurality of transceivers in turn to send a signal to each of the other transceivers. The control apparatus is further configured to determine an attenuation in the received signals, generate weighing, derivative, and attenuation matrices from the signals, group the pixels into a plurality of provinces, select each province in turn and solve for a change in attenuation in each of the pixels while setting the pixels in other provinces to zero, aggregate solutions from each of the provinces into a rough estimate, re-solve each province using the aggregated rough estimate, aggregate the re-solved solutions from each province into a refined estimate, and generate an image from the refined estimate.

11 Claims, 22 Drawing Sheets

(58) Field of Classification Search
USPC .................................................. 342/452, 465
See application file for complete search history.

(56) References Cited

U.S. PATENT DOCUMENTS

| | | | | |
|---|---|---|---|---|
| 8,441,349 | B1* | 5/2013 | Libby | G08B 29/188 |
| | | | | 340/541 |
| 8,482,452 | B2 | 7/2013 | Chambers et al. | |
| 8,502,728 | B2 | 8/2013 | Joshi et al. | |
| 8,508,403 | B2* | 8/2013 | Paglieroni | G01V 3/15 |
| | | | | 342/22 |
| 8,710,984 | B2* | 4/2014 | Wilson | G08B 21/22 |
| | | | | 340/539.23 |
| 8,942,450 | B2 | 1/2015 | Riddell | |
| 9,036,769 | B2 | 5/2015 | Noguchi | |
| 9,086,501 | B2 | 7/2015 | Beer et al. | |
| 9,503,620 | B2* | 11/2016 | Konrad | G06K 7/10366 |
| 9,784,692 | B2 | 10/2017 | Kruglick | |
| 9,820,157 | B1* | 11/2017 | Rajendran | G01S 1/042 |
| 10,028,148 | B1* | 7/2018 | Rajendran | G01S 5/0252 |
| 10,171,943 | B1* | 1/2019 | Rouphael | H04L 65/403 |
| 10,204,428 | B2* | 2/2019 | Almutiry | G01S 13/003 |
| 2007/0201611 | A1 | 8/2007 | Pratx et al. | |
| 2011/0273321 | A1 | 11/2011 | Joshi et al. | |
| 2013/0003077 | A1 | 1/2013 | Suehira et al. | |
| 2018/0218519 | A1 | 8/2018 | Almutiry | |

OTHER PUBLICATIONS

Martin et al., "Accuracy vs. Resolution in Radio Tomography," IEEE Trans. Signal Processing, vol. 62, No. 10, pp. 2480-2491 (May 2014).
Anderson et al., "Radio Tomography for Roadside Surveillance," IEEE J. Selected Topics in Signal Processing, vol. 8, No. 1, pp. 66-79 (Feb. 2014).
Bro et al., "A Fast Non-Negativity-Constrained Least Squares Algorithm," Journal of Chemometrics, vol. 11, No. 5, [[. 393-401 (1997).
Chen et al., "Nonnegativity constraints in numerical analysis," Proc. Symposium on the Birth of Numerical Analysis, Leuven, Belgium, pp. 109-140 (2007).
Kim et al., "Fast Nonnegative Matrix Factorization: An active-set-like Method and Comparisons," SIAM Journal on Scientific Computing, vol. 33, No. 6, pp. 3261-3281 (2011).
Kim et al., "Regularization Paths for Sparse Nonnegative Least Squares Problems with Applications to Life Cycle Assessment Tree Discovery," Proc. IEEE 13th International Conference on Data Mining, Dallas, TX (2013).
Slawski et al., "Non-negative least squares for high-dimensional linear models: Consistency and sparse recovery without regularization," Electronic Journal of Statistics, vol. 7, pp. 3004-3056 (2013).
Zhao et al., "Radio Tomographic Imaging and Tracking of Stationary and Moving People via Kernel Distance," IPSN 13 Proceedings of the 12th international conference on Information processing in sensor networks, pp. 229-240 (2013).

* cited by examiner

| QUANTITY | SIZE | UNITS | STRUCTURE |
|---|---|---|---|
| y | M x 1 | dB | |
| W | M x N | m | SPARSE, ≤ 5% |
| x | N x 1 | dB/m | |
| α | 1 x 1 | $m^2$ | |
| $D_H$ or $D_V$ | N x N | UNITLESS | VERY SPARSE, ≤ 0.1% |
| Q | N x N | UNITLESS | VERY SPARSE, ≤ 0.1% |
| S | N x N | $m^2$ | DIAGONALLY DOMINANT |
| Π | N x M | $m^{-1}$ | |

| STEP (FIG. 6) | OPERATIONS | MEMORY WORDS |
|---|---|---|
| BLOCK 28 | $MN^2$, SPARSE | $N^2$ |
| BLOCK 30 | $\frac{1}{3}N^3$ | OVERWRITE $S$ |
| BLOCK 32 | $MN$, SPARSE | $N$ |
| BLOCK 34 | $N^2$ | OVERWRITE $W^T y$ |
| BLOCK 36 – LS | $N^2$ | OVERWRITE $d$ |
| BLOCK 36 – NNLS | $\frac{1}{192}N^4$ | OVERWRITE $d$ |
| LS | $O\left(\frac{1}{3}N^3\right)$ | $O(N^2)$ |
| NNLS | $O\left(\frac{1}{3}N^3 + \frac{1}{192}N^4\right)$ | $O(N^2)$ |

| STEP (FIGS. 9A-C) | OPERATIONS | MEMORY WORDS |
|---|---|---|
| BLOCK 64 | $M N P$, SPARSE | $P^2$ |
| BLOCK 66 | $\frac{1}{3}P^2N$ | $\frac{1}{2}PN$ |
| BLOCK 68 | $M N$, SPARSE | $N$ |
| BLOCK 70 | $PN$ | $N$ |
| BLOCK 72 - LS | $PN$ | OVERWRITE $\mathbf{d}$ |
| BLOCK 72 - NNLS | $O\left(\frac{1}{192}P^3N\right)$ | OVERWRITE $\mathbf{d}$ |
| BLOCK 86 | $M N L$ | $N$ |
| BLOCK 92 | $P N$ | $P$ |
| BLOCK 94 - LS | $P N$ | OVERWRITE $\hat{x}^{(1)}$ |
| BLOCK 94 - NNLS | $O\left(\frac{1}{192}P^3N\right)$ | OVERWRITE $\hat{x}^{(1)}$ |
| PLS | $O\left(\frac{1}{3}P^2N\right)$ | $O\left(\frac{1}{2}PN\right)$ |
| PNNLS | $O\left(\frac{1}{96}P^3N\right)$ | $O\left(\frac{1}{2}PN\right)$ |

METHOD FOR RADIO TOMOGRAPHIC IMAGE FORMATION

CROSS-REFERENCE TO RELATED APPLICATIONS

This application is a continuation of U.S. application Ser. No. 15/040,585, entitled "System and Method for Radio Tomographic Image Formation," filed on Feb. 10, 2016, the entirety of which is incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

Field of the Invention

The present invention generally relates to tomographic imaging and, more particularly, radio tomographic imaging.

Description of the Related Art

RADIO tomography or Radio Tomographic Imaging (RTI) is a method of using a network of radio transceivers to form a rough image of a region of interest for tracking movement patterns within the scene or mapping obstructions. It is analogous to Computed Tomography (CT) imaging, though on a much larger scale with much coarser resolution. As such, individuals or objects to be tracked do not need to carry radio emitters, they merely need to produce a radio shadow. The resulting imagery is privacy-sensitive, since personally identifying information cannot be extracted from the coarse image; available in all lighting and weather conditions; and available even when imaging through most wall construction materials.

In RTI, each transceiver in a network repeatedly sends short messages to all other transceivers. If an object is physically obstructing a given link, then the link's Received Signal Strength (RSS) will drop relative to calibration. By observing link attenuations, it is possible to determine which pixels of the resulting image are occupied and how dense the obstructions are relative to Radio Frequency (RF) propagation. The image formation process is similar to that in computed tomography imagery, with the differences lying in the propagation modeling and the somewhat sparser and more irregular placement of radio links in RTI.

Contemporary work regarding RTI is small but gradually increasing. The literature tends to focus on methods for producing better imagery or methods for tracking targets using RTI. However, as the number of sensors in a network is increased, computational complexity also increases. Resulting computational time for each image (frame) can be prohibitive to actual real time monitoring.

Accordingly, there is a need in the art for a system and method that addresses the computational complexity of radio tomographic imaging.

SUMMARY OF THE INVENTION

Radio tomographic imaging is a tool for position tracking and scene mapping. It works like a large-scale computed tomography image of the environment, using a network of low-cost radio transceivers. One of the challenges in radio tomography is enabling large-scale deployments that can operate in real time with limited computing power. Embodiments of the invention utilize a new algorithm for producing a radio tomographic image with performance nearly identical to (and arguably better than) the most popular contemporary implementations at a fraction of the computational cost.

Embodiments of the invention provide a system and method for generating radio tomographic images. A plurality of transceivers is positioned around a region to be imaged. That region is then divided into a plurality of pixels. A control apparatus is in communication with each of the transceivers in the plurality of transceivers. The apparatus is configured to cause each of the plurality of transceivers in turn to send a signal to each of the other transceivers of the plurality of transceivers and determine if there is an attenuation in the signal received by the transceivers. The apparatus is further configured to generate a weighing matrix W, derivative matrices $D_H$ and $D_V$, and matrix y from the signals sent to each of the plurality of receivers. The region is then partitioned into a plurality of provinces each containing a unique set of pixels of the plurality of pixels. Each province of the plurality of provinces is selected in turn and solved for a change in attenuation in each of the pixels in the province while the pixels in the other provinces of the plurality of provinces are set to zero. Solutions from each of the plurality of provinces are aggregated into a rough estimate. Each province of the plurality of provinces is re-solved for the change in attenuation in each of the pixels in the province using the aggregated rough estimate. The re-solved solutions from each of the plurality of provinces are aggregated into a refined estimate, which may then be used to generate an image.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 11 contains a table with complexities of the algorithm in FIGS. 9A-9C;

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
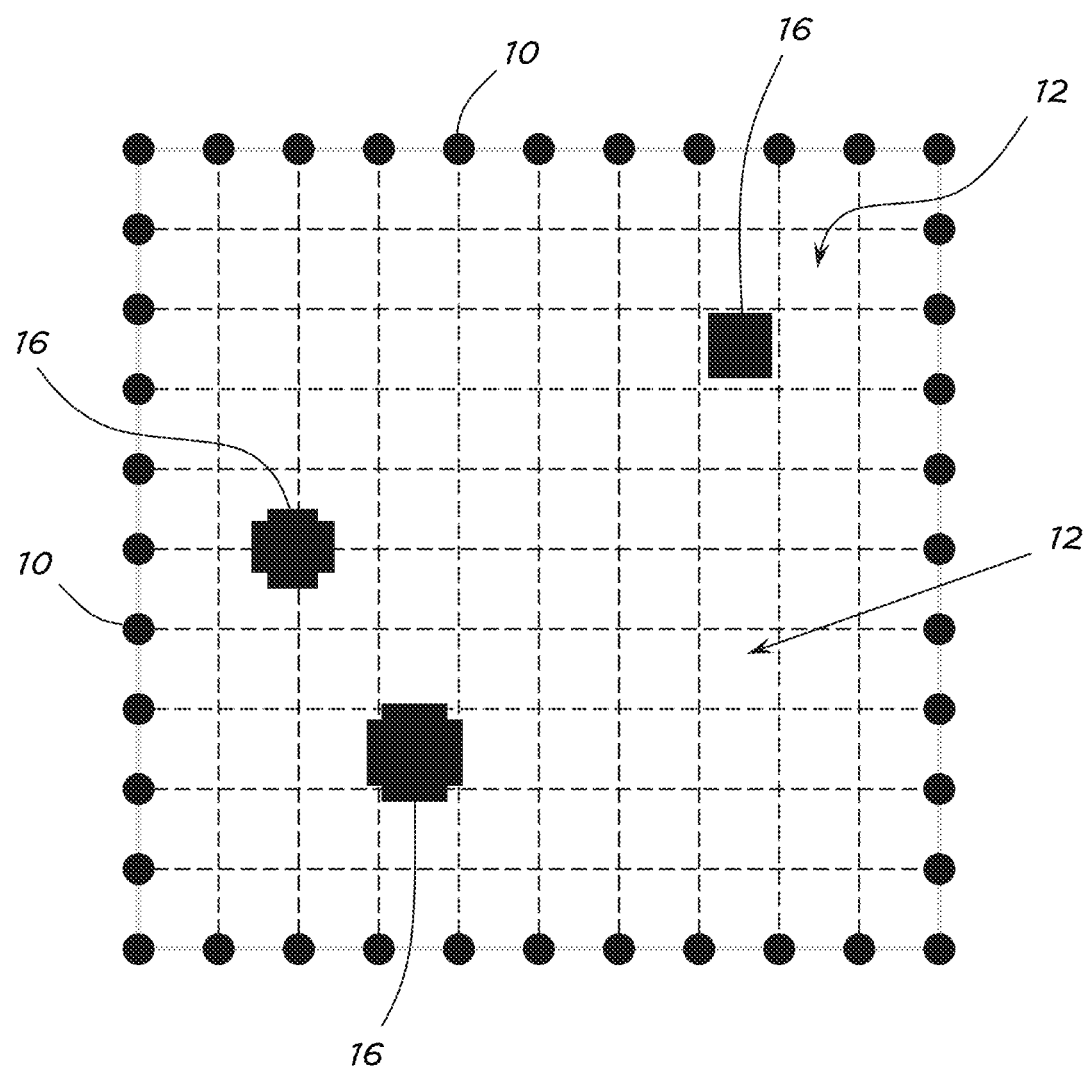
FIG. 1 is a schematic diagram of an exemplary radio tomographic imaging environment.
Figure 2:
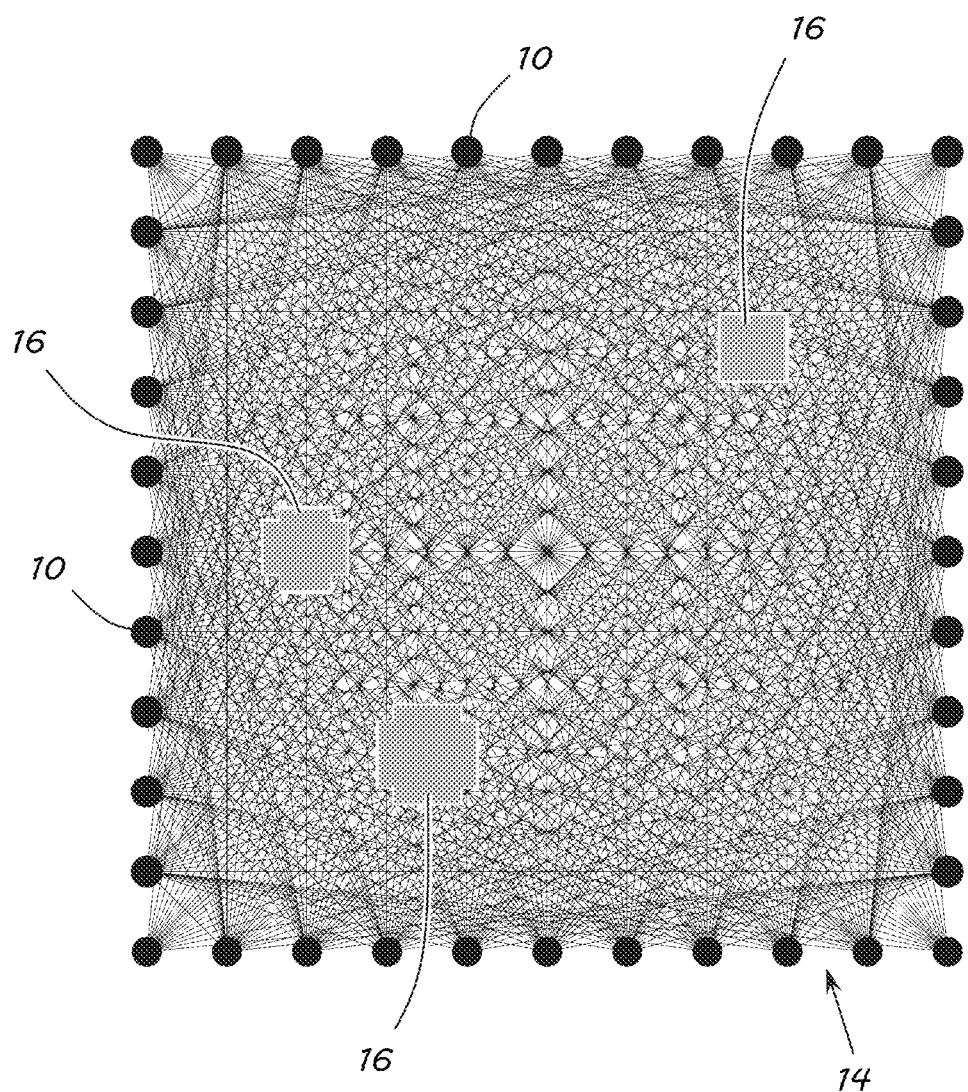
FIG. 2 is the radio tomographic imaging environment of FIG. 1 illustrating links between sensors.
Figure 3:
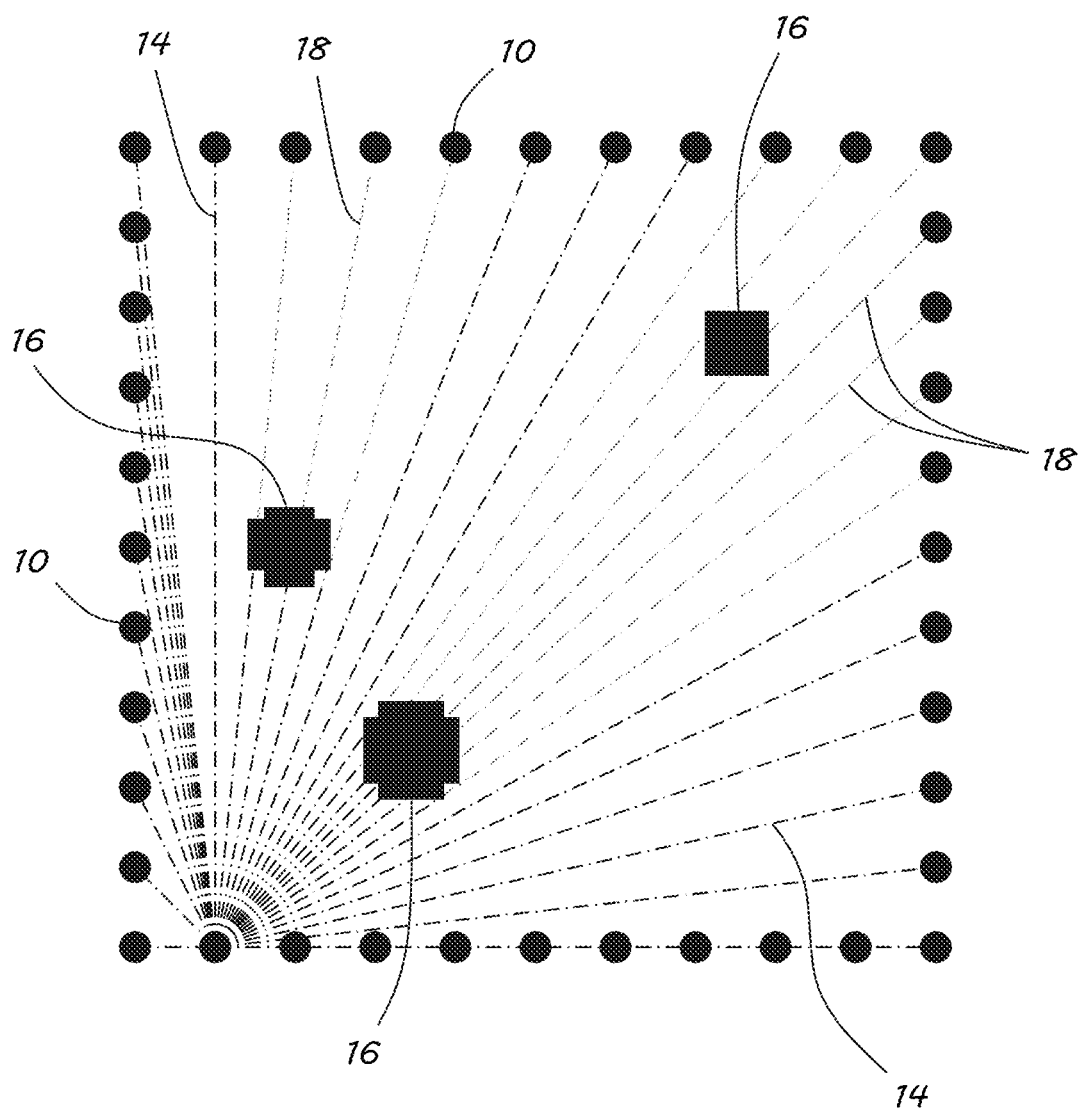
FIG. 3 is the radio tomographic imaging environment of FIG. 1 illustrating links from one sensor to other sensors.
Figure 4:
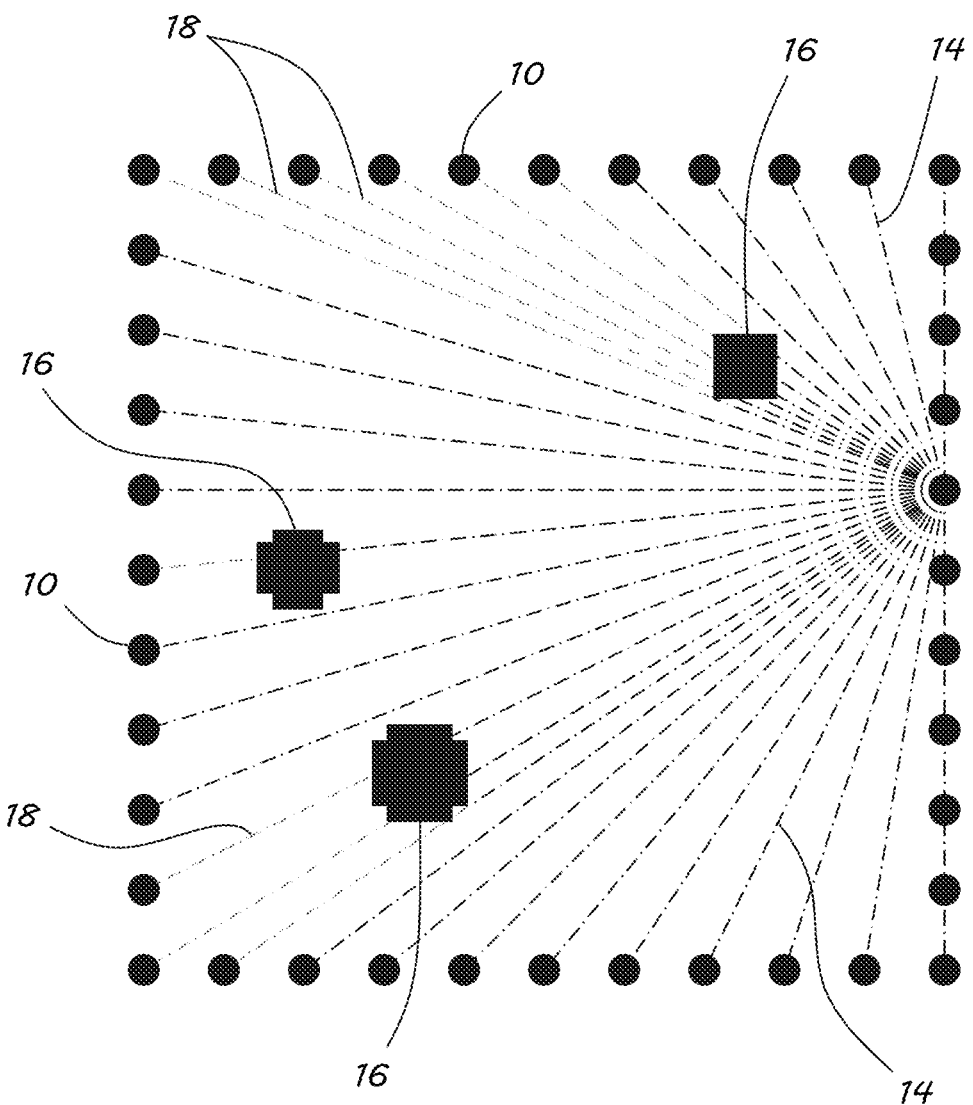
FIG. 4 is the radio tomographic imaging environment of FIG. 1 illustrating links from another sensor to the other sensors.

Before setting out details of embodiments of the invention, a brief review of a standard process for generating radio tomographic imaging (RTI) will be presented. This standard process will also provide a baseline for comparison with embodiments of the invention. In RTI, K transceivers 10 (acting as both transmitter and receiver) are generally deployed around a region divided into N pixels 12 as illustrated in FIG. 1. While the arrangement in FIG. 1 and examples provided throughout are generally two dimensional in nature, the methodology presented could also be extended to three dimensions, where the monitored region would be divided into a series of voxels in those three dimensional embodiments. Typically, a transceiver network is fully connected with $M=K(K-1)/2$ unique links 14 as illustrated in FIG. 2. Calibration is performed to determine a baseline RSS of each link. When a person or object 16 enters the region, attenuation 18 will increase within pixels 12 where new obstructions are present as illustrated in FIGS. 3 and 4. Relative to calibration, a change in attenuation 16 within pixels 12 is $x \in \mathcal{R}^{N \times 1}$ and a drop in RSS along links 14 is $y \in \mathcal{R}^{M \times 1}$, related by $$y = Wx + n, \tag{1}$$

with weighting matrix $W \in \mathcal{R}^{M \times N}$ and measurement noise $n \in \mathcal{R}^{M \times 1}$. The RSS drop in dB on link in is $y_m$ and the attenuation 18 on links 14 as they traverse pixel n is $x_n$. Since x represents attenuation of RF propagation, the units of x are dB per meter (dB/m) and thus the units of W are meters. Herein, x is treated as a deterministic unknown and n is modeled as white Gaussian noise with variance $\sigma_n^2$. Experimental observations suggest $\sigma_n$ is about 4 dB to about 6 dB. In other embodiments, an alternative measurement is to measure variance in the signal strength rather than the change, referred to as variance-based RTI or vRTI.

Weighting matrix W has taken on various forms though the NeSh model is generally the most widely used. This review and description of embodiments following use the NeSh model, though any of the other contemporary models may also be used. The NeSh model is represented as $$W_{m,n} = d_m^{-0.5} \cdot \|[d_{m,n,1} + d_{m,n,2} < d_m + \lambda], \tag{2}$$

where $\|[\cdot]$ is an indicator function, $d_m$ is a length of link m, $d_{m,n,1}$ and $d_{m,n,2}$, are distances from link endpoints to pixel n, and $\lambda$ is a tunable parameter.

A common estimator for x is a least squares (LS) solution with Tikhonov regularization. In order to make various expressions more compact, the following matrices are defined as follows:

$$Q \triangleq D_H^T D_H + D_V^T D_V \tag{3}$$

$$S \triangleq W^T W + \alpha Q \tag{4}$$

$$\Pi \triangleq S^{-1} W^T, \tag{5}$$

where $D_H$ and $D_V$ compute the derivatives in the horizontal and vertical dimensions, relative to a top-down view; and $\alpha$ is a user-determined constant that indicates the emphasis on the regularization term. The regularized LS estimate is then $$\hat{x} = \arg\min_x [\|Wx - y\|^2 + \alpha \|D_H x\|^2 + \alpha \|D_V x\|^2] \tag{6}$$

$$= \arg\min_x [x^T S x - 2 y^T W x]$$

$$= \Pi y. \tag{7}$$

Equation (7) is the baseline for comparison, and will be referred to herein as the "standard LS" method. Note that this solution imposes no constraints on x, though physically x should be non-negative.

If W is known in advance, the matrix $\Pi$ can be computed offline. However, one common problem is that frequently transceivers will fail to report, and the corresponding link values will be unknown. This may occur if the multipath and interference environment makes it difficult for the simple transceivers to demodulate the messages sent from other transceivers. When this occurs, one solution is to delete the relevant rows of W and then recompute $\Pi$. Similarly, if mobile transceivers are employed, the W matrix is ever changing, and $\Pi$ must be periodically recomputed. This is particularly relevant since the implementation of equation (7) is trivial if $\Pi$ is available from offline computations. Finally, in non-negative least squares (NNLS) implementations that will be discussed below with respect to embodiments of the invention, $W^TW$ must be decimated before the matrix inversion, so simply pre-computing Π is generally not an option.

Figures 5, 8A, 8B:
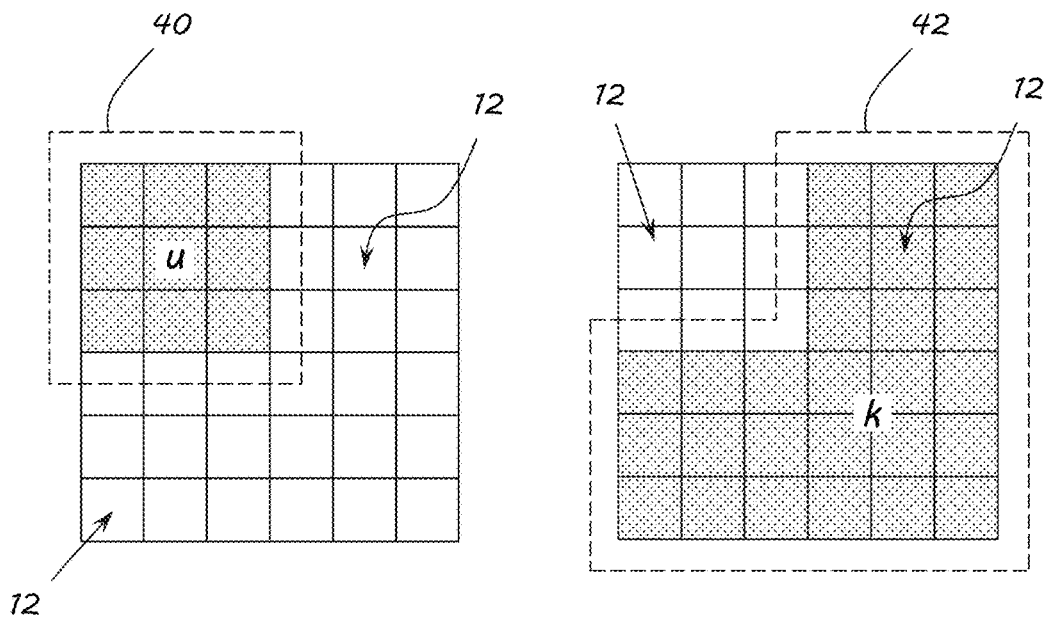
FIG. 5 contains a table with dimensions and structure of radio tomographic imaging variables.
FIGS. 8A and 8B are schematic diagrams of another radio tomographic imaging environment illustrating a partitioning of the environment.
Figure 6:
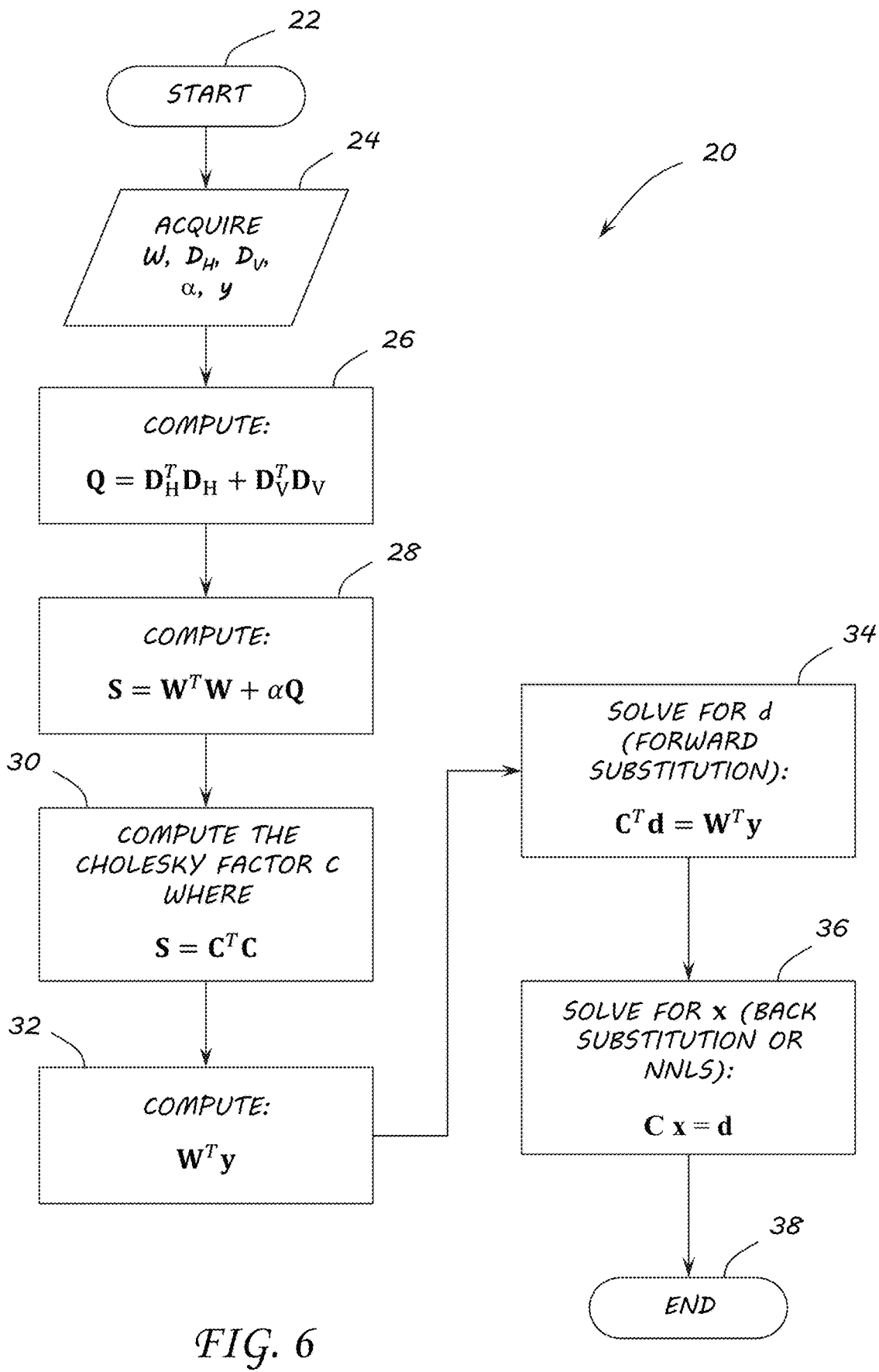
FIG. 6 is a flowchart of an algorithm for a standard least squares solution for radio tomographic imaging.
Figure 7:
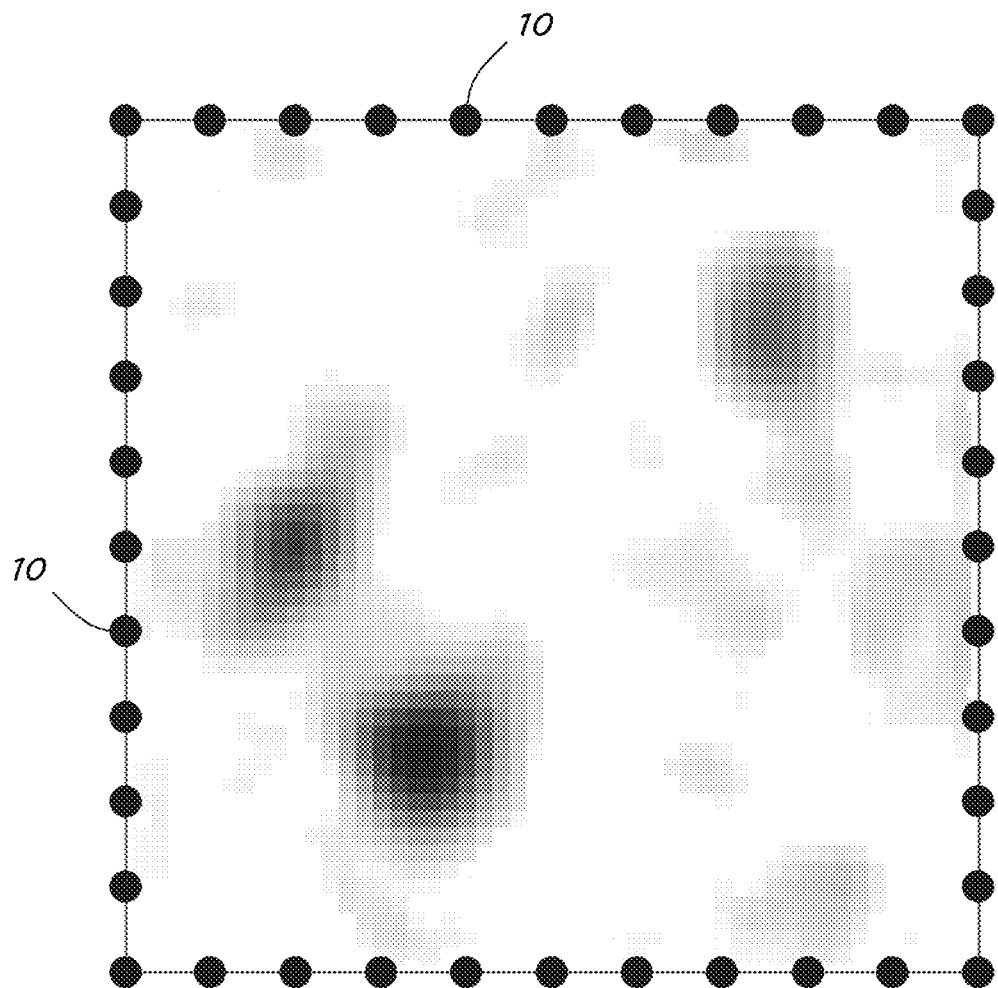
FIG. 7 is a resulting image of the radio tomographic imaging environment of FIG. 1 from the algorithm in FIG. 6.

The table in FIG. 5 lists some of the important quantities in RTI along with their sizes and any special structure they might possess. Flowchart 20 in FIG. 6 illustrates the steps involved with the standard LS method assuming no off line computations. The method begins at block 22. The weighing matrix W, derivative matrices $D_H$ and $D_V$, matrix y, and user constant α are acquired in block 24. Q is then calculated according to equation (3) in block 26, and S is computed using Q and equation (4) in block 28. A Cholesky Factor C is computed in block 32. $W^Ty$ is then calculated in block 34. The Cholesky Factor and the result of block 32 is then used to solve for d in block 34 using a forward substitution. Finally, x is solved for in block 36 using a back substitution, or as will be presented below, using NNLS. The process completes at block 38. The resulting image from this method for the example illustrated in FIGS. 1-4 is illustrated in FIG. 7. The blobbiness and image noise are typical, and are caused by Gaussian measurement noise and the fact that the problem is under-determined.

"The size of an RTI network" refers to the number of monitored pixels, N; though, the number of unique links M should scale by $M = \mathcal{O}(N)$ in order for an acceptable image to be produced. As RTI networks increase in size, two problems occur: (i) the required communication time increases, and (ii) the computational complexity of the solution to equation (7) grows very large.

Issue (i) generally relates to a token ring protocol employed by most contemporarily deployed RTI systems. Typically, each of the K transceivers 10 transmits in turn, while all other transceivers 10 listen and determine the RSS. An image frame may be computed after K successive transmissions (one per transceiver 10). Moreover, each such transmission contains K information words, though due to overhead, the message length is only affine in K rather than linear in K. Thus, the communication time scales by at least K. The corresponding decrease in the frame rate may lead to choppy video and is generally undesirable. Conversely, in larger networks, more time will be needed to produce each frame. Unfortunately, the increase in communication time by a factor of K is much less than the required increase in computation time.

Issue (ii) arises from the fact that the matrix S must be inverted. The term "inverted" is used herein to imply solution of the appropriate set of linear equations. Matrix inverses will not be directly computed. While many of the elements of S are small, few of them are actually zero, so inversion techniques exploiting sparsity cannot generally be applied. As such, the inversion requires about $\mathcal{O}(\frac{1}{3}N^3)$ operations. Moreover, note that typically $N = \mathcal{O}(M) = \mathcal{O}(\frac{1}{2}K^2)$, so even though frame communication time increases with at least K (per issue (i)), typically frame computation time can increase as fast as $K^6$, so the computation time is the bottleneck in large networks. Embodiments of the invention address this latter bottleneck by proposing an algorithm for reducing the computational requirements, since issue (ii) is far more problematic in large networks than issue (i).

The largest computational draw in the solution process above is the inversion (or factorization) of the N×N matrix S. Embodiments of the invention partition the area to be monitored into L provinces 40 with P pixels 12 each (four provinces of nine pixels each are illustrated in FIGS. 8A and 8B). This results in L times as many matrix inversions, but each is only $L^{-3}$ times the former computational complexity.

The pixels 12 in each province 40 are solved for one at a time, using all links but assuming the pixels in all other provinces 42 contain no obstructions. Then once a tentative solution exists for each province 40, each province 40 will be resolved while accounting for the initial solution of the other provinces and while imposing regularization both within the province of interest and across provincial boundaries. Further iterations can be used to refine the solution if needed. Thus, in some embodiments, the process may iterate until some stopping criteria is met. In some of these embodiments, the stopping criteria may be a set number of iterations. Other embodiments may utilize error minimization or some other function as stopping criteria.

Mathematically, a scene x is partitioned into the "unknown" current province 40, $x_u$, and the "known" (previously estimated) remainder of the scene 42, $x_k$, where $x_k=0$ in the first pass as illustrated in FIGS. 8A and 8B. By separating these terms in equation (6), $x_u$ is estimated via $$\hat{x}_u = \arg\min_{x_u} \left\| [W_u, W_k] \begin{bmatrix} x_u \\ x_k \end{bmatrix} - y \right\|^2 + \alpha \left\| [D_{H,u}, D_{H,k}] \begin{bmatrix} x_u \\ x_k \end{bmatrix} \right\|^2 + \alpha \left\| [D_{V,u}, D_{V,k}] \begin{bmatrix} x_u \\ x_k \end{bmatrix} \right\|^2, \quad (8)$$

where subscripts u and k denote the partitioning of the matrices into columns corresponding to the elements of $x_u$ and $x_k$. Minimizing the quadratic requires setting the gradient with respect to $x_u$ to zero, which yields $$Fx_u = W_u^T y - g \quad (9)$$

$$F \triangleq W_u^T W_u + \alpha D_{H,u}^T D_{H,u} + \alpha D_{V,u}^T D_{V,u} \quad (10)$$

$$g \triangleq W_u^T W_k x_k + \alpha D_{H,u}^T D_{H,k} x_k + \alpha D_{V,u}^T D_{V,k} x_k \quad (11)$$

Note that on the first pass, g=0 so it can be ignored. Ignoring any non-negativity constraints on x, the solution is $$\hat{x}_u = F^{-1}(W_u^T y - g). \quad (12)$$

Inclusion of non-negativity constraints will be addressed with embodiments below; though the standard practice seems to be projection of $\hat{x}$ onto the set of non-negative values, which is not optimal.

Figure 9A:
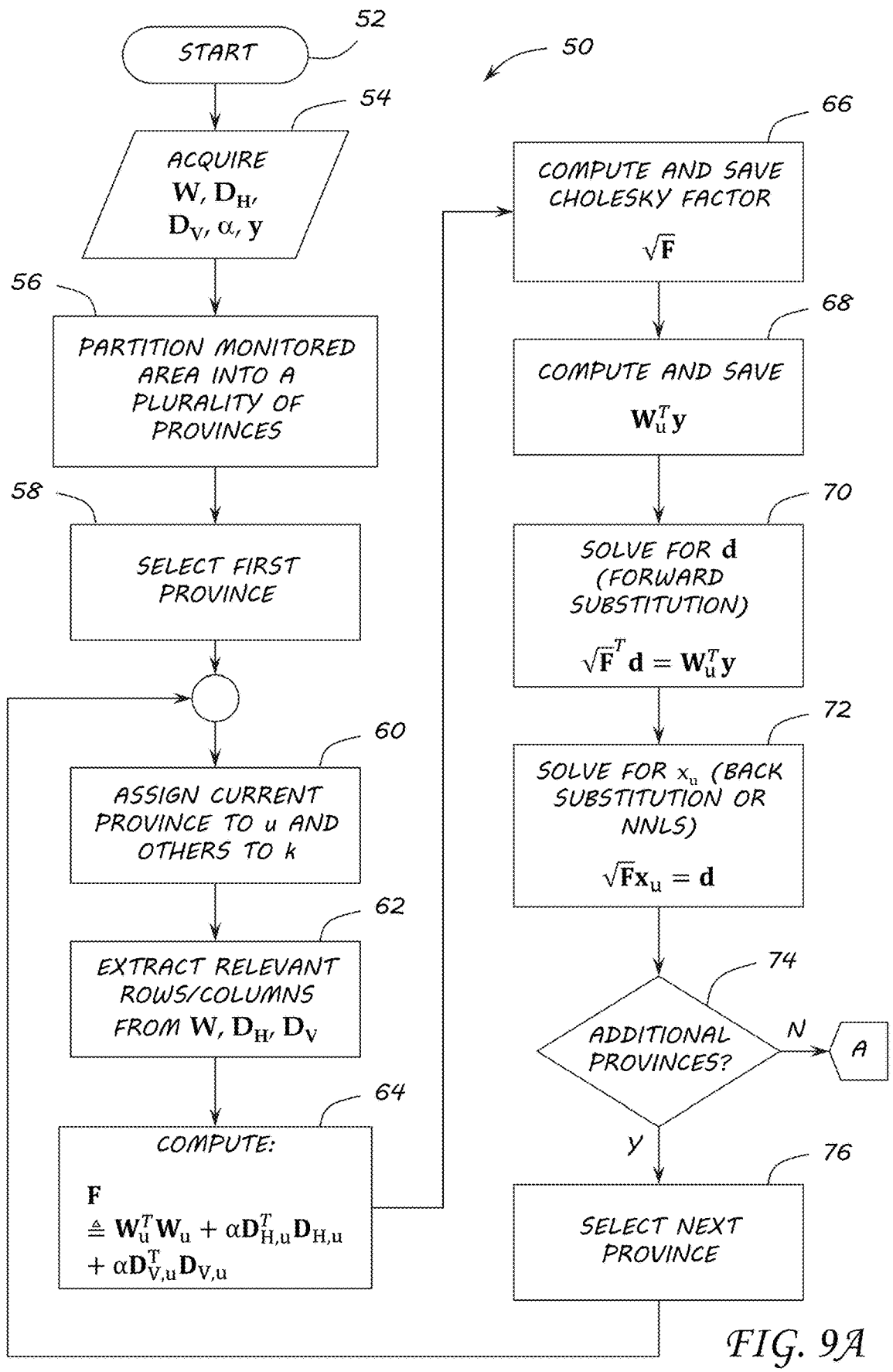
FIGS. 9A-9C are a flowchart of an algorithm for a provincial least squares solution for radio tomographic imaging.
Figure 9B:
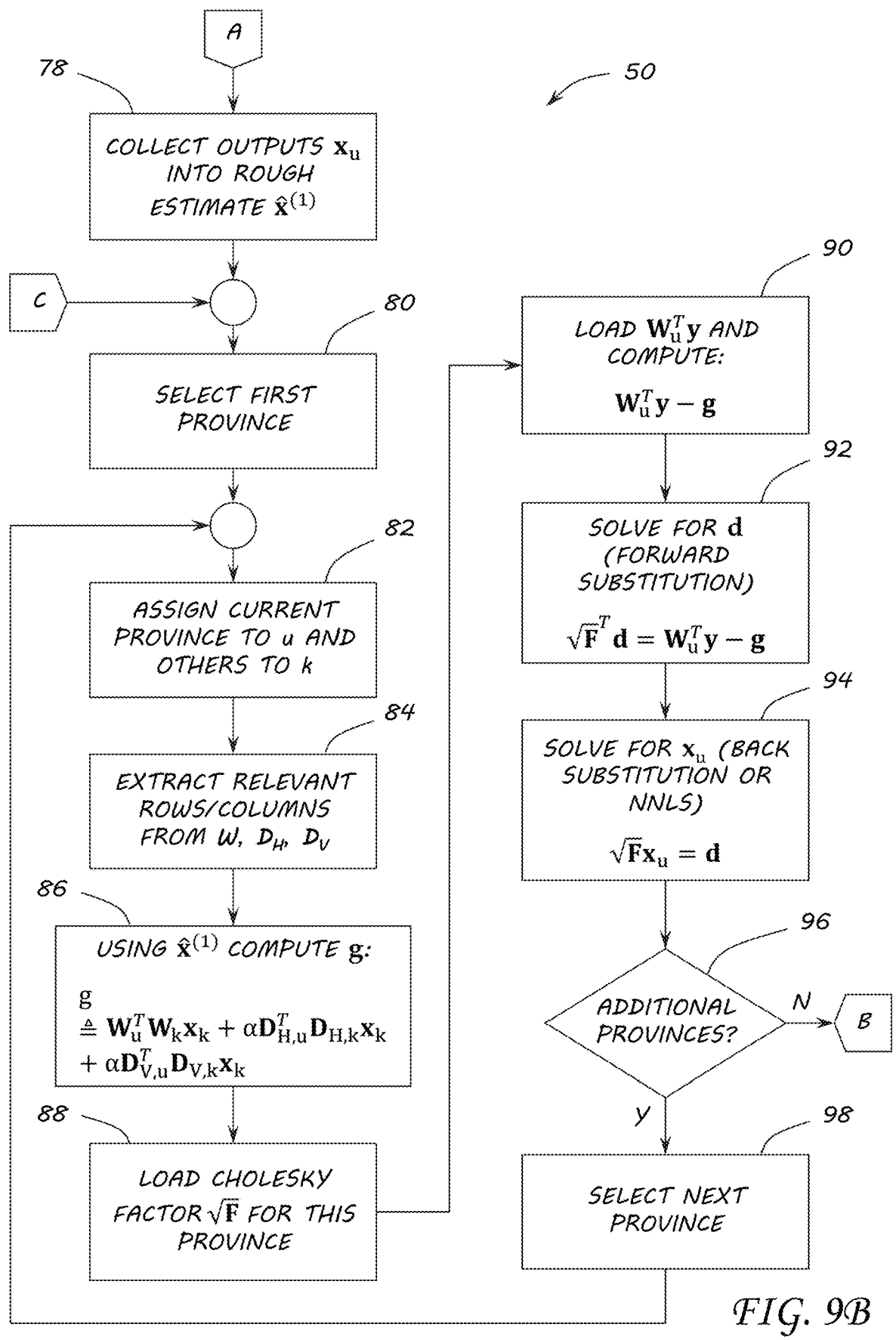
Figures 9C, 10:
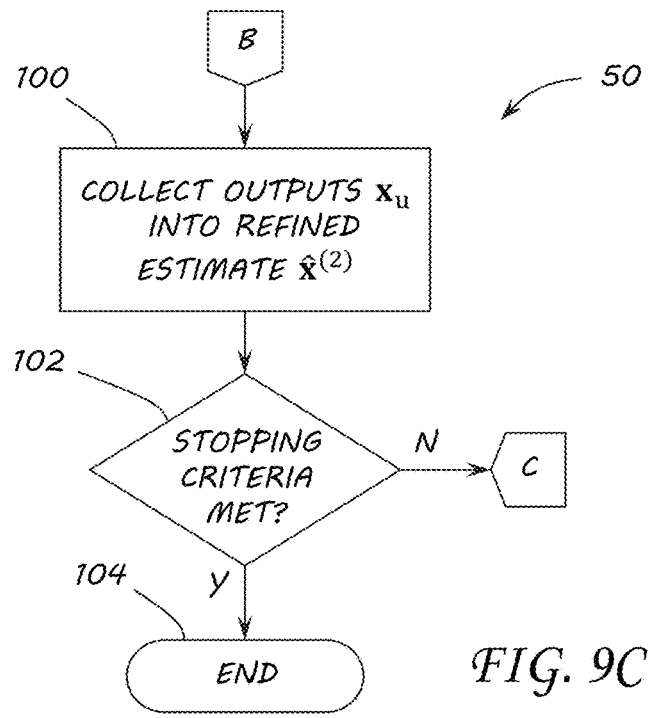
FIG. 10 contains a table with complexities of the algorithm in FIG. 6.

Flowchart 50 in FIGS. 9A-9C illustrates a provincial LS method assuming no offline computations. The process begins at block 52. Similar to the conventional approach in FIG. 6, the weighing matrix W, derivative matrices $D_H$ and $D_V$, matrix y, and user constant α are acquired in block 54. The scene being monitored is partitioned into a plurality of provinces 40 of a number of pixels 12 in block 56. The first province is selected in block 58. The selected province is assigned to u and the remaining provinces are assigned to k in block 60. The selected province is used to partition $W, D_H$, and $D_V$, extracting the relevant rows/columns in block 62. F is then computed in block 64 using equation (10). The Cholesky Factor is then computed in block 66 and saved. $W_u^T y$ is then calculated in block 68 and saved. The Cholesky Factor and the result of block 68 are then used to solve for d in block 70 using a forward substitution. Finally, $x_u$ is solved for in block 72 using a back substitution, or as will be presented below, using NNLS. If additional provinces exist and need to be solved ("Yes" branch of decision block 74), the next province is selected in block 76 and the process of blocks 60-72 is repeated. If there are no additional provinces to be solved ("No" branch of decision block 74), then the outputs $x_u$ from each of the provinces are collected into a rough estimate $\hat{x}^{(1)}$ in block 78.

With this rough estimate, the begins again with the first province being selected in block 80. The selected province is assigned to u and the remaining provinces are assigned to k in block 82. The selected province is used to partition W, $D_H$, and $D_V$, extracting the relevant rows/columns in block 84. Using $\hat{x}^{(1)}$, g is then computed in block 86 using equation (11). The Cholesky Factor for this province is loaded in block 88. $W_u^T y$ for the current province is loaded and $W_u^T y - g$ is calculated in block 90. The loaded Cholesky Factor and the result of block 90 is then used to solve for d in block 92 using a forward substitution. Finally, $x_u$ is solved for in block 94 using a back substitution, or as will be presented below, using NNLS. If there are additional provinces ("Yes" branch of decision block 96), then the next province is selected and the process of blocks 82-94 are repeated. If all of the provinces have been solved ("No" branch of decision block 96), then all of the outputs $x_u$ from each of the provinces are collected into a refined estimate) $\hat{x}^{(2)}$ in block 100. If a stopping criteria has not been met ("No" branch of decision block 102), then the process repeats blocks 80-100 for a next iteration. If a stopping criteria has been met ("Yes" branch of decision block 102), then the process concludes at block 104. As set out above, the stopping criteria may be a set number of iterations for some embodiments. Other embodiments may utilize error minimization or some other function as stopping criteria. Still other embodiments may use some other criteria to determine if additional iterations are necessary. Selecting a stopping criteria may be related to the number of transceivers 10 and the amount of processing resources available.

The contemporary and provincial solutions for the embodiments above used a LS approach to solve the matrix equations. This will now be extended to a NNLS implementation and the proposed provincial least squares (PLS) method will be extended to a provincial non-negative least squares (PNNLS) implementation. Note that the optimization problem of equation (6) does not restrict x to be non-negative, despite the fact that obstructions cannot absorb a negative amount of energy. An initial attempt at constraining the search space to $x_n > 0 \forall n$ was presented by Anderson et al. in "Radio Tomography for Roadside Surveillance." However, that approach was not guaranteed to converge and did not lend itself to solution using standard optimization toolboxes. Accordingly, a new formulation is derived for embodiments of the invention that can be solved using any standard NNLS solver. This formulation may be applied to both the standard regularized RTI solution and the provincial implementation in embodiments of the invention.

Common NNLS solvers assume the problem has the form $$\hat{x}_{NNLS} = \arg\min_{x, x_n \geq 0} \|Cx - d\|^2 \tag{13}$$

for some matrix C and vector d. A version of one algorithm for solving equation (13) is available in MATLAB® as the function "lsqnonneg." More recently, a "Fast NNLS" algorithm was developed that reuses computations but is mathematically equivalent to the original NNLS implementation.

To use any of these NNLS solvers, the regularized problem of equation (6) needs to be written in the form of equation (13). Additionally, the appropriate choices of C and d need to be determined. One contemporary solution incorporates the regularization terms into the problem by "stacking" the component matrices, leading to a larger-dimensional problem. Another approach to regularizing the NNLS problem involves incorporating an L1 norm penalty term to enforce sparsity or simply noting that NNLS provides its own inherent regularization. However, none of these approaches explicitly enable Tikhonov regularization without making the matrix dimensions larger.

Expanding (13) and dropping constants, $$\hat{x}_{NNLS} = \arg\min_{x, x_n \geq 0} [x^T C^T C x - 2 d^T C x]. \tag{14}$$

Equations (6) and (14) can be made identical by choosing $$C = \sqrt{S} \tag{15}$$

$$d = C^{-T} W^T y, \tag{16}$$

where $C = \sqrt{S}$ is the upper triangular Cholesky factor of a matrix S such that $C^T C = S$. In FIG. 6, block 36, the LS implementation already requires solving $Cx = d$ with the same C and d given in equations (15) and (16). That is, $\|Cx - d\|$ is already being minimized, just without a constraint on x. Thus, converting the algorithm to a NNLS implementation is as simple as using a NNLS solver with inputs of the C and d matrices, which have been computed already; whereas the LS implementation uses back substitution with the same C and d matrices.

Embodiments of the invention utilizing the provincial algorithm may be similarly extended to an NNLS implementation. By expanding the quadratic in equation (8), dropping constants, and comparing to equation (13), the appropriate choices of C and d for the provincial NNLS solution are $$C = \sqrt{F} \tag{17}$$

$$d = C^T (W_u^T y - g), \tag{18}$$

similar to equations (15) and (16). In order to convert the LS implementation into a NNLS implementation, the back substitution steps in FIGS. 9A-9C, blocks 72 and 94, simply need to use a NNLS solver with equations (17) and (18) as inputs.

The computational complexity of the standard algorithm of FIG. 6 is shown in the table in FIG. 10, and the complexity of the proposed algorithm of FIGS. 9A-9C is shown in the table in FIG. 11. Steps with negligible complexity are ignored, and all values in the table in FIG. 11 have included a factor L to account for the fact that each step must be performed for each of the L provinces. In these tables, an "online only" approach is being assumed; that is, large matrices such as H are not pre-computed. There are several reasons for this. First, if the transceivers are mobile or if they are subject to intermittent link outages (a common problem encountered during experimentation), then the W matrix and all of its children must be recomputed constantly. Second, in NNLS implementations, the size of the matrix to be inverted is repeatedly changed based on the measured data, hence the inverse (or Cholesky factorization) cannot be pre-computed and stored. Third, some computing platforms simply cannot handle an N×N Cholesky decomposition for large N, even when performed offline; so tabulating the complexity in full helps identify bottlenecks that may benefit from the embodiments utilizing the provincial approach, even when W is constant. That said, in small, robust networks, the H matrix may be computed offline, leading to a relatively simple online solution via equation (7).

As set out above, there are two computational bottlenecks in the LS portion of the table in FIG. 10. First, computation of WIN (block 28) requires M $N^2$ multiply-adds. However, W is very sparse; for example, in the simulations that will be presented below, only 3.3% of the elements of W are nonzero. Thus, a sparse matrix multiply will effectively remove all of this complexity. The next bottleneck is the Cholesky factorization in block 30, which for a symmetric matrix requires about $\frac{1}{3}N^3$ operations. Even though W is sparse, $W^T W$ is not, hence this complexity cannot be avoided.

The computational bottlenecks in the LS portion of the table in FIG. 11 are the computation of F (block 64) and its Cholesky factor (block 66). Since the D matrices are extremely sparse, the complexity in F comes from computing $W_u^T W_u$, using M $P^2$ multiply-adds for each of L provinces. However, again W is extremely sparse, so most of these operations can be avoided. The real burden again comes from the Cholesky factorizations, requiring a total of $\frac{1}{3}P^3 L = \frac{1}{3}P^2 N$ operations.

Fast NNLS involves gradually adding elements to x and re-solving for just those elements, with the remainder set to zero. The number of iterations required is somewhere between 1 and N, with the exact value being data-dependent. However, typically $$\frac{N}{2}$$

iterations are required, and this ratio will be used to roughly estimate the complexity. At iteration i, there are i elements of x and an i×i Cholesky factorization must be performed on a symmetric matrix. Thus, the total NNLS complexity of this dominant term is $$\sum_{i=1}^{N/2} \frac{1}{3} i^3 \approx \frac{(N/2)^4}{12} = \frac{N^4}{192}. \tag{19}$$

This can vary greatly, but it provides a very rough order of magnitude for the complexity. For the provincial algorithm utilized by embodiments of the invention, instead of one NNLS estimate of size N, L estimates are performed that are each of size P=N/L. The total complexity is then reduced by a factor of about $L^3$ for the NNLS portion.

Comparing the tables in FIGS. 10 and 11, the highest order term in the complexity has been reduced by $L^2$. However, the lower order terms and memory transfer times limit the runtime improvement somewhat, so the improvements in total runtime do not correspond directly to the decrease in computations. Another computational benefit of the provincial approach is that it can naturally be parallelized, since the L provinces are solved independently. In contrast, the single large Cholesky decomposition in the standard approach cannot be split into independent components. In short, the actual computational improvements will be largely platform and implementation dependent.

Before evaluating experimental results, a test using simulated data is presented to demonstrate that the data obeys all of the explicit and implicit assumptions presented above. To validate the embodiments set out above, the standard LS approach from equation (7), the NNLS extension of the standard approach from equation (6) to (14), and the PLS approach and its PNNLS extension given in FIGS. 9A-9C will be compared. Since the PLS and PNNLS methods can use multiple iterations (usually two is good enough, though more may be used), labels in the figures will be followed by the number of iterations, such as "PLS: 4" to indicate 4 iterations of PLS.

Figure 12A:
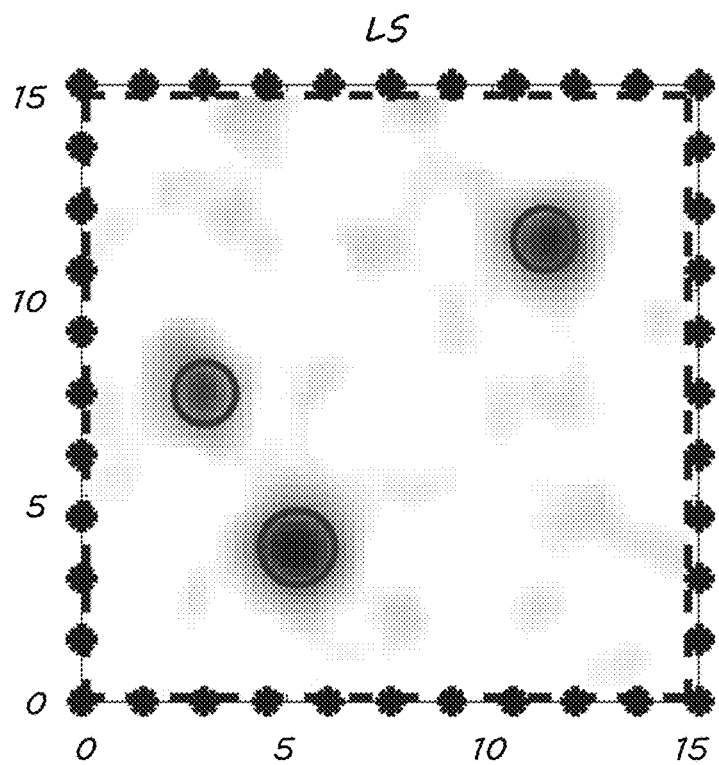
FIGS. 12A-12D contain images of a simulated radio tomographic imaging environment using different solution algorithms.
Figure 12B:
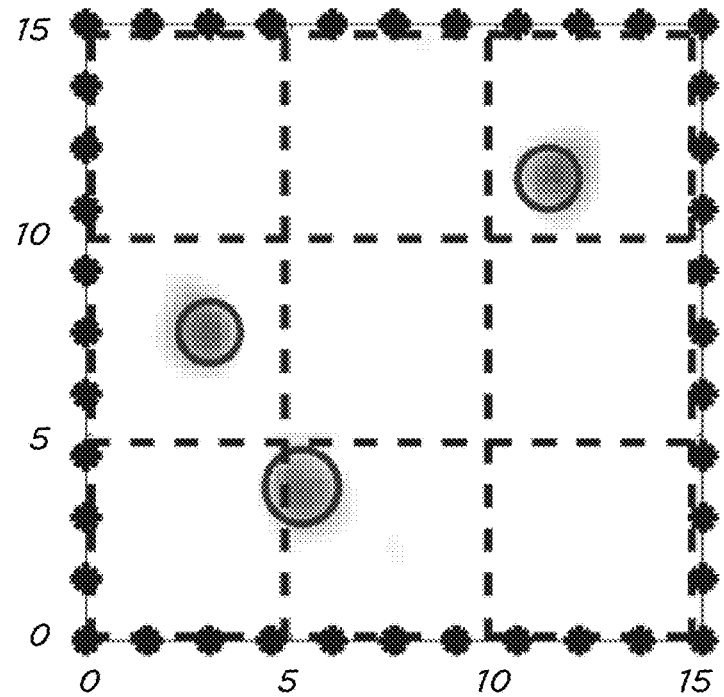
Figure 12C:
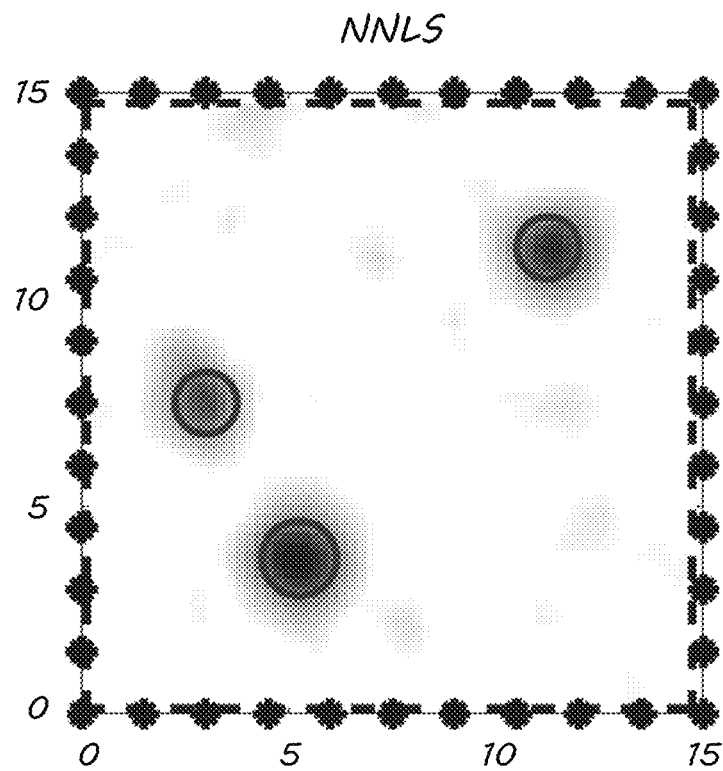
Figure 12D:
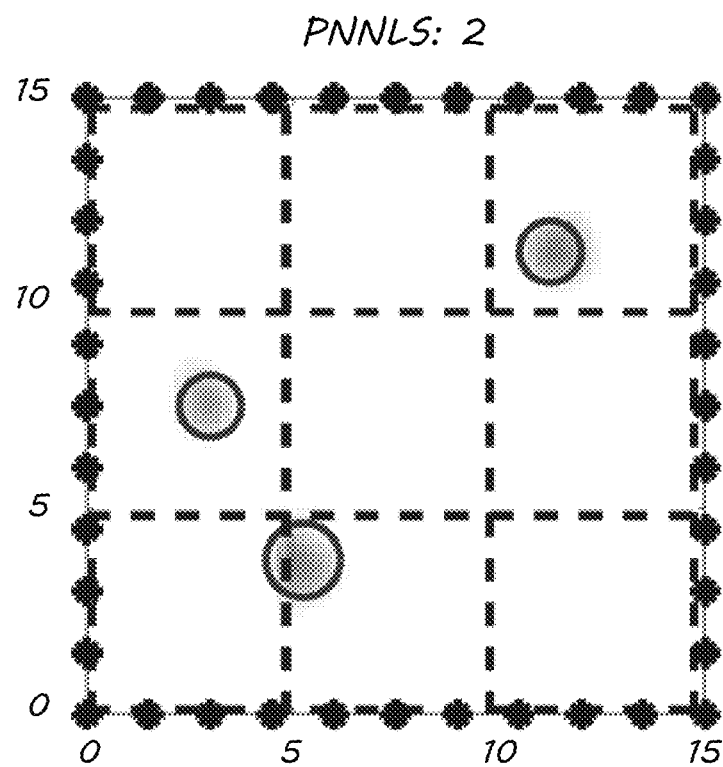
Figure 13A:
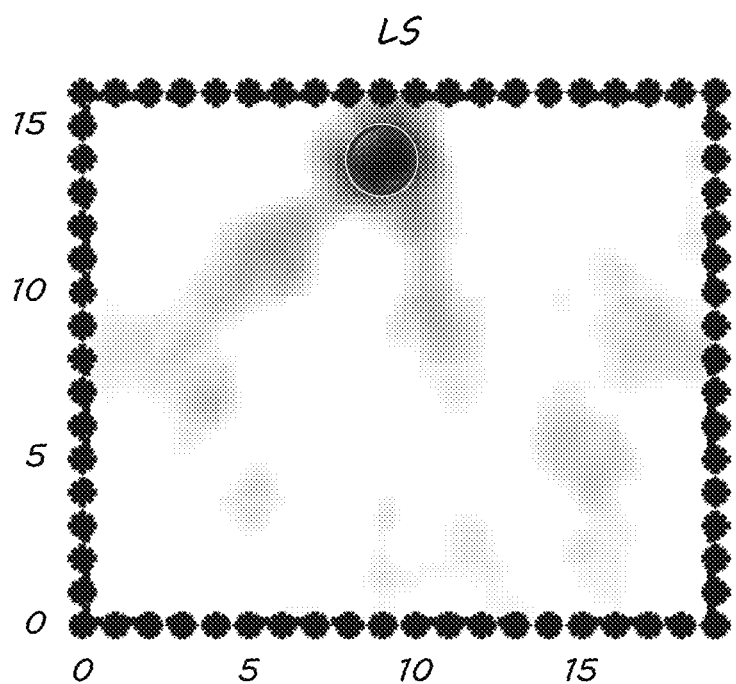
FIGS. 13A-13D contain images from a radio tomographic imaging environment containing one obstruction using different solution algorithms.
Figure 13B:
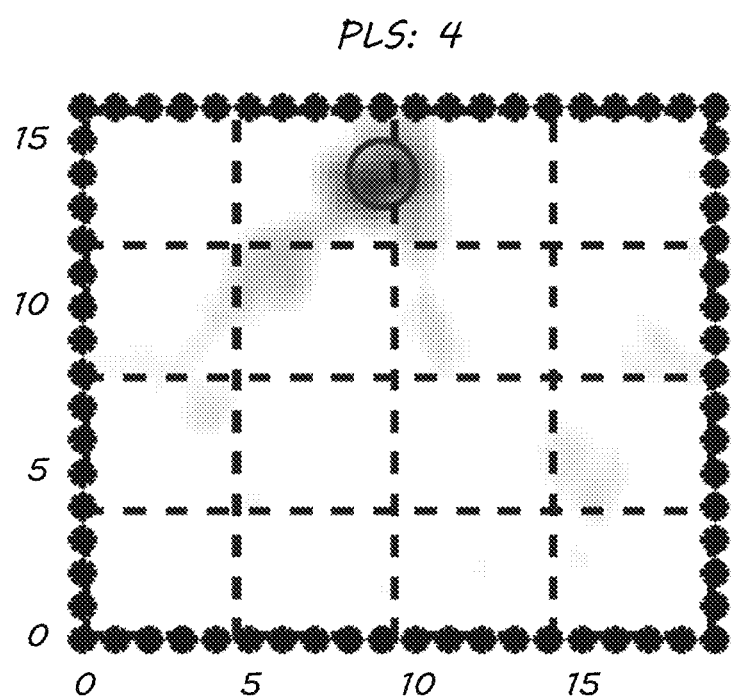
Figure 13C:
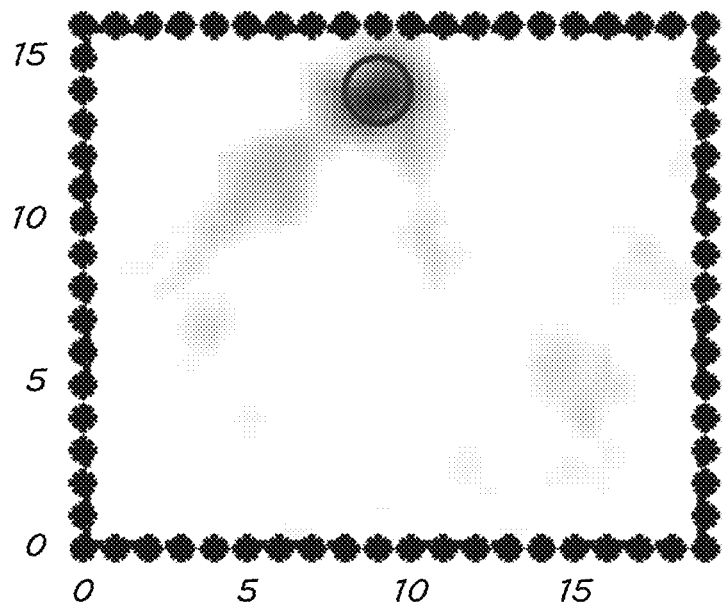
Figure 13D:
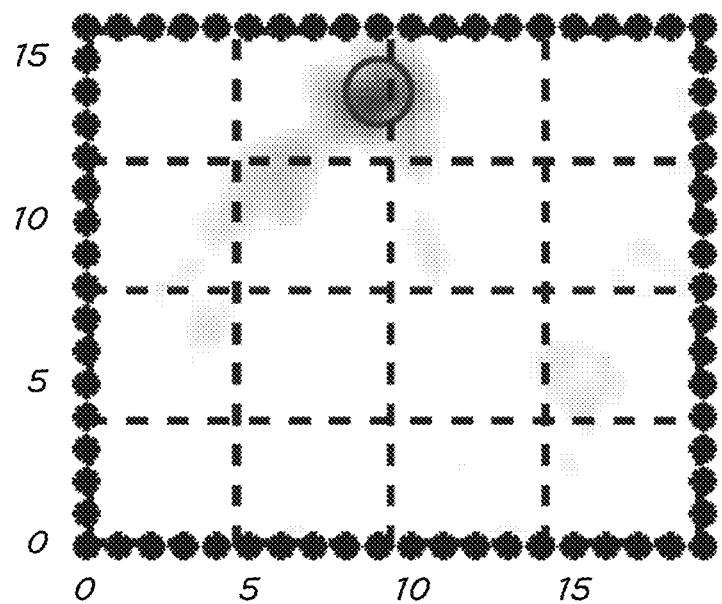
Figure 14A:
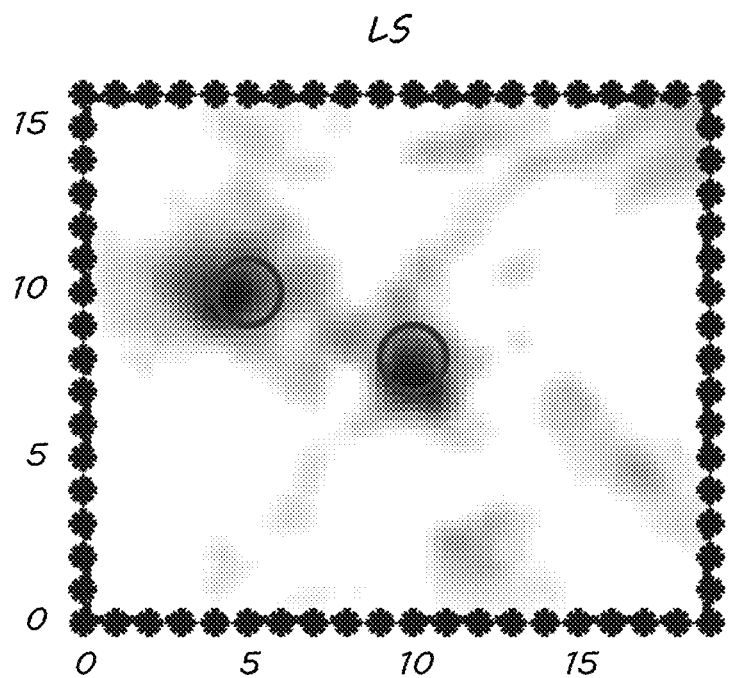
FIGS. 14A-14D contain images from a radio tomographic imaging environment containing two obstructions using different solution algorithms.
Figure 14B:
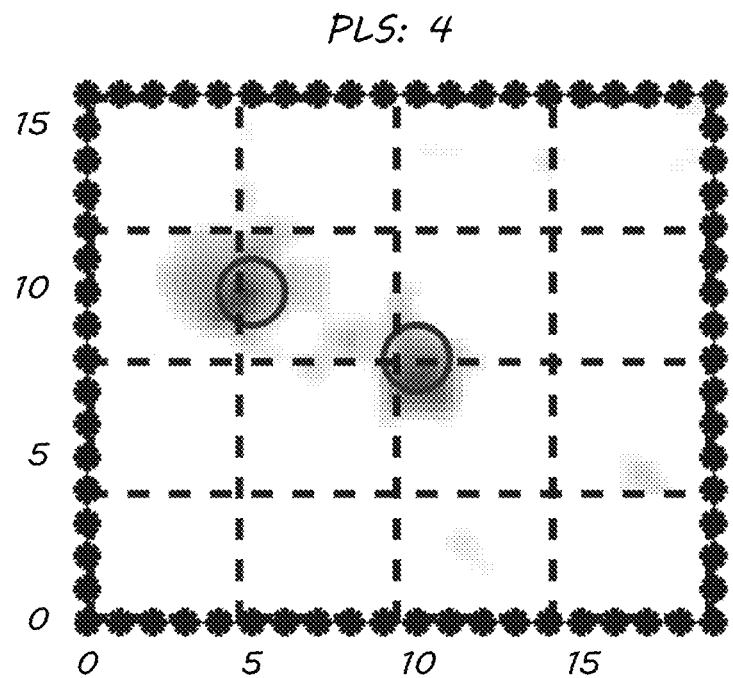
Figure 14C:
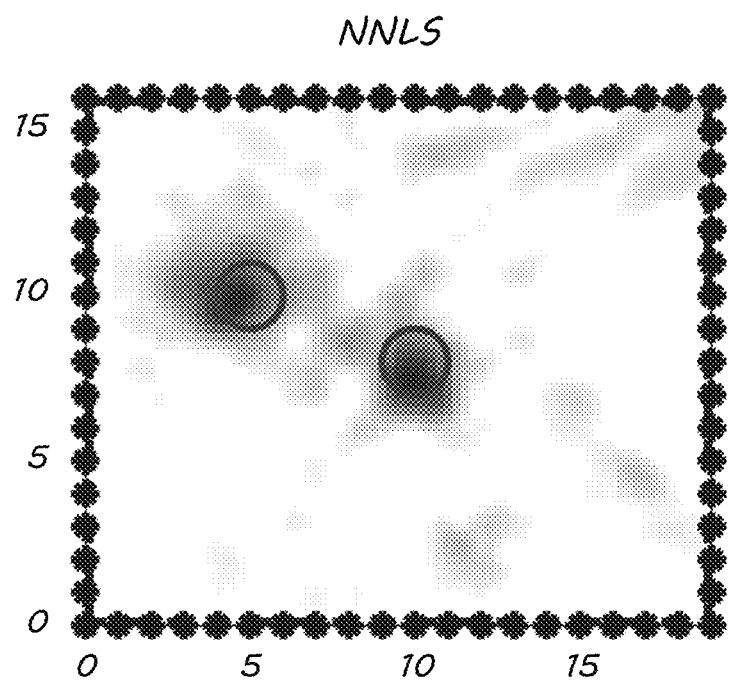
Figure 14D:
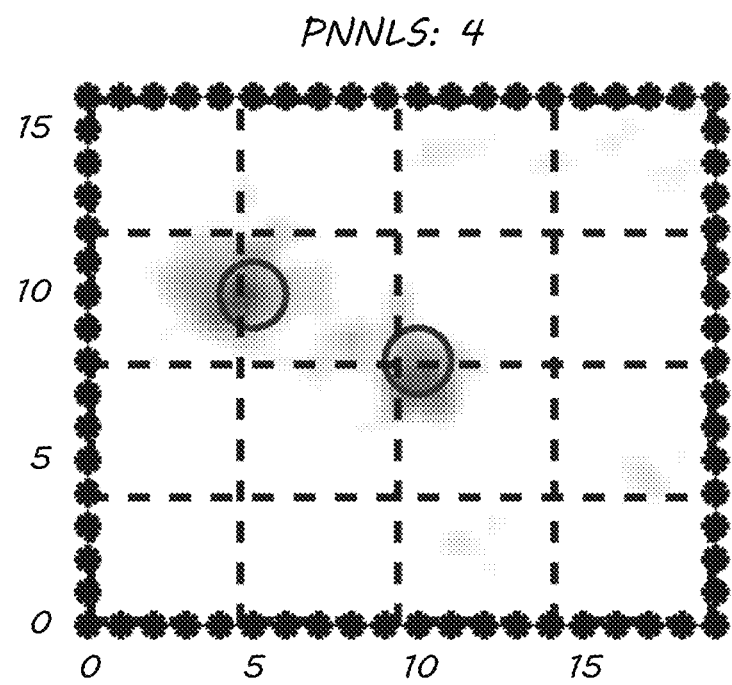
Figure 15A:
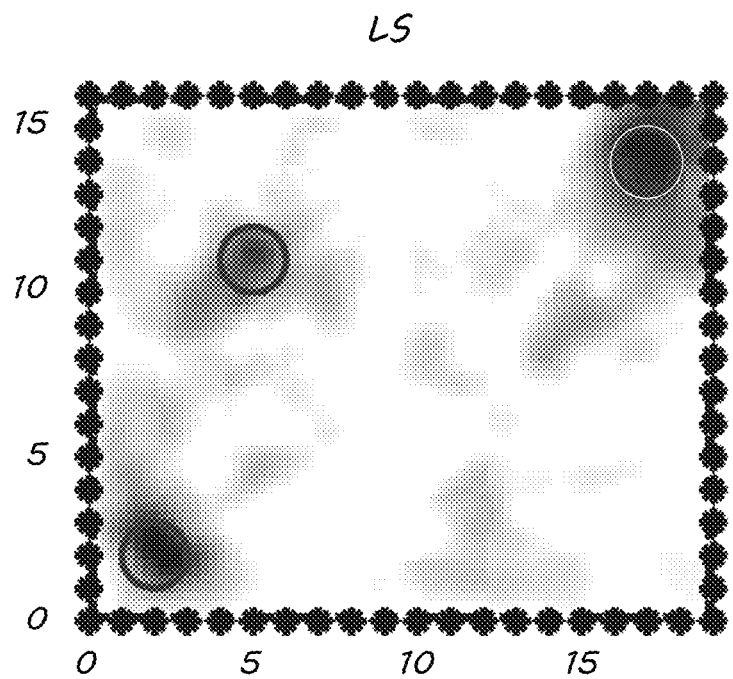
FIGS. 15A-15D contain images from a radio tomographic imaging environment containing three obstructions using different solution algorithms.
Figure 15B:
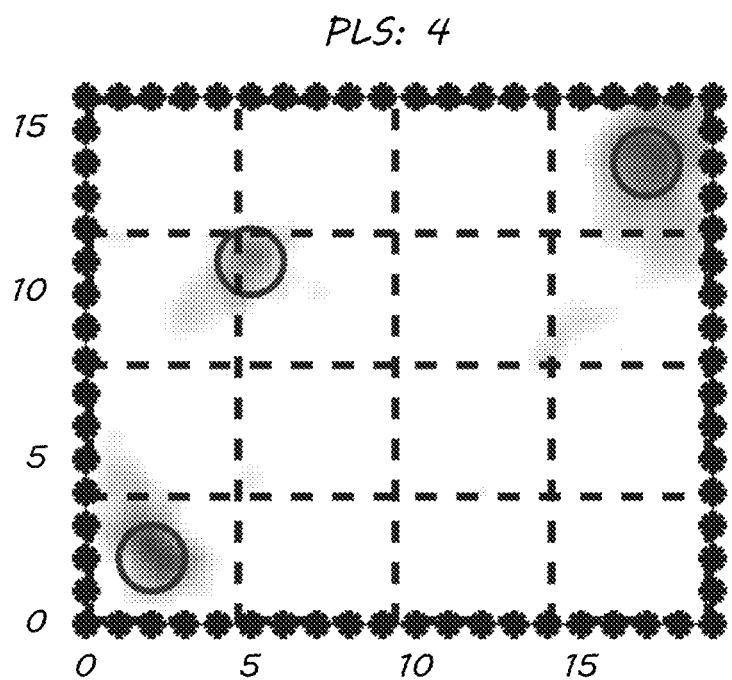
Figure 15C:
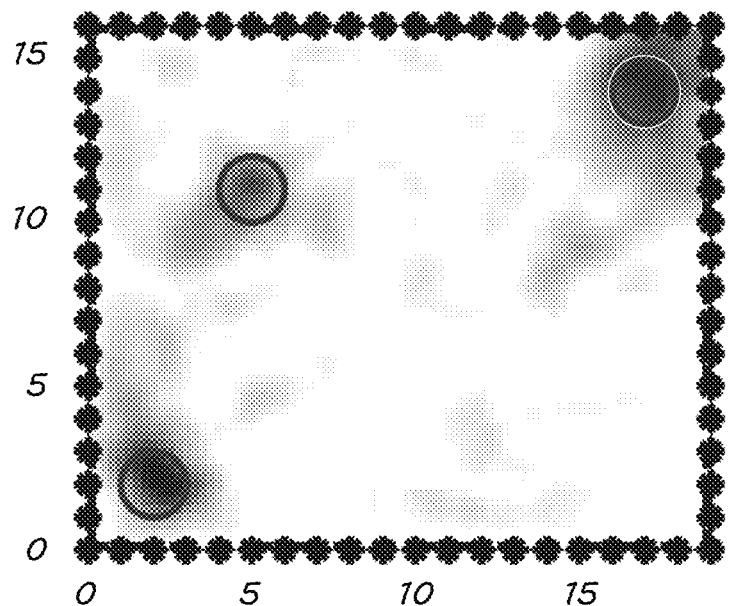
Figure 15D:
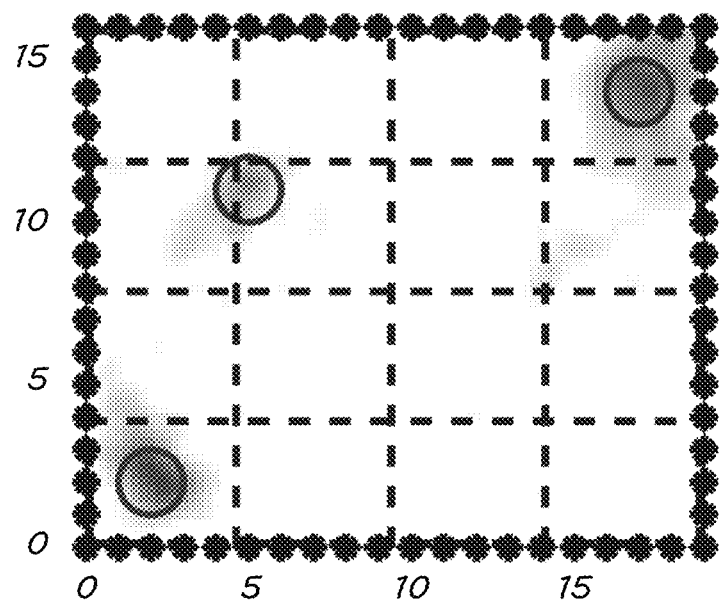

FIGS. 12A-12D illustrate one realization of a simulation comparing the standard and provincial approaches. In this example, the full RTI network consists of K=40 transceivers on the perimeter, M=780 unique links, and N=4225. The scene has been partitioned into L=9 provinces of about P=484 pixels each. FIG. 12A shows the standard LS estimate, FIG. 12B shows the provincial LS estimate (after 2 iterations), FIG. 12C shows the NNLS extension of the standard estimate, and FIG. 12D shows the provincial NNLS estimate (after 2 iterations). A comparison of 12A to 12B or 12C to 12D shows that the resulting image estimate is not degraded by the partitioning. Rather, it appears that the provincial approach has a dampening effect which significantly suppresses noise, though the target density estimates are also slightly reduced. The circles in FIGS. 12A-12D indicate locations of simulated obstructions. The dashed lines show the province boundaries and the asterisks are the transceiver locations. Run times for the four solutions were 4.96 seconds for FIG. 12A, 0.48 seconds for FIG. 12B, 5.38 hours for FIG. 12C, and 61.6 seconds for FIG. 12D. All algorithms were implemented in MATLAB®, and were optimized to minimize computational time, though other means or other solvers may also be used to process the algorithms. In this simulated scenario, PLS ran 10.3 times faster than LS and PNNLS ran 314 times faster than NNLS.

After the simulated data testing, images were processed from an experimental test bed that was rectangular in shape. The lab environment was realistic rather than idealized, with many metal file cabinets and equipment racks along the periphery of the test bed. The presence of the large number of metal sources will generally complicate the imaging process, though some RTI variants try to exploit this rich multipath environment rather than counteract it. 70 transceivers were used for the RTI test bed with 20 transceivers along the long edge of the test bed and separated by 15 transceivers along the short edges. The transceivers were TelosB TPR2400CA motes manufactured by MEMSIC, running a Spin protocol developed at the University of Utah. They were mounted at waist level (3'4") on PVC pipes. The motes operate in the 2.4 GHz band. Due to unknown factors (possibly the multipath or interference environment), most data sets had 5% to 10% of the link values left unreported. Whenever this occurred, the offending links were omitted and the W matrix was recomputed.

FIGS. 13A through 15D show imagery from experiments 1 to 3, with 1 to 3 targets, respectively. There were chosen out of a total of 23 experimental data sets as those where the standard LS implementation performed the best, from a qualitative image accuracy point of view. The provincial algorithms performed better than their standard counterparts in every single experiment; i.e. PLS outperformed LS and PNNLS outperformed NNLS. Observe that the NNLS and PLS algorithms both have a noise suppression effect. Thus, since PLS already reduces the noise, in some cases there is little added benefit to a PNNLS implementation over PLS.

The images from the first, single object experiment, are shown in FIGS. 13A-13D. The circles in these figures indicate locations of human obstructions. The dashed lines show the province boundaries, and the asterisks are the transceiver locations. The run times for the four images were 9.94 seconds for FIG. 13A, 0.666 seconds for FIG. 13B, 8.36 hours for FIG. 13C, and 48.2 seconds for FIG. 13D. FIGS. 14A-14D show the dual object experiment, where the circles indicate the locations of two human obstructions and again the dashed lines show province boundaries, and the asterisks show transceiver locations. The run times for these four images were 6.49 seconds for FIG. 14A, 0.690 seconds for FIG. 14B, 10.5 hours for FIG. 14C, and 59.4 seconds for FIG. 14D. FIGS. 15A-15D show the three object experiment, where the circles indicate the locations of three human obstructions, and as with the previous two experiments, the dashed lines show province boundaries and the asterisks show transceiver locations. The run times for these four images were 13.1 seconds for FIG. 15A, 0.741 seconds for FIG. 15B, 9.92 hours for FIG. 15C, and 59.8 seconds for FIG. 15D.

Figure 16:
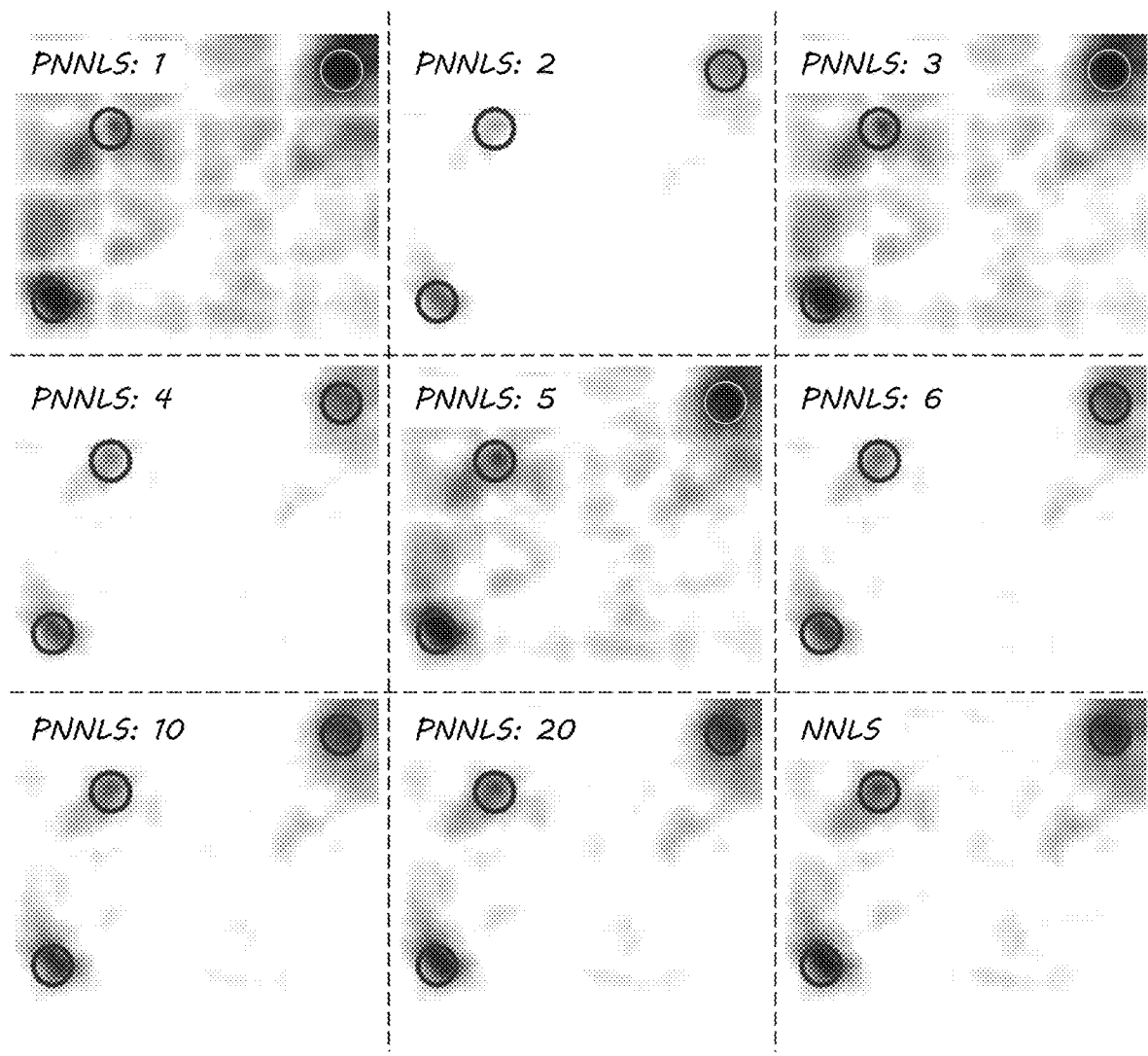
FIG. 16 contains images from the radio tomographic imaging environment of FIGS. 15A-15D illustrating an evolution of images from multiple iterations of the algorithm in FIGS. 9A-9C.

FIG. 16 shows data from the same experiment as FIGS. 15A-15D, but it focuses on showing the evolution of the image as a function of the iteration number. With more iterations, the provincial algorithm alternates between noisy images on odd iterations and sparse images on even iterations, all the while gradually refining the image. Iteration 2 provides a very clean, noise-free image, but the target portion of the image is also suppressed slightly. Later iterations cause the target to get darker and more noise to appear. From the point of view of target detection, 2 iterations seems ideal; but from the point of producing imagery identical to that of the standard approach, 10-20 iterations appear to be required.

Figure 17:
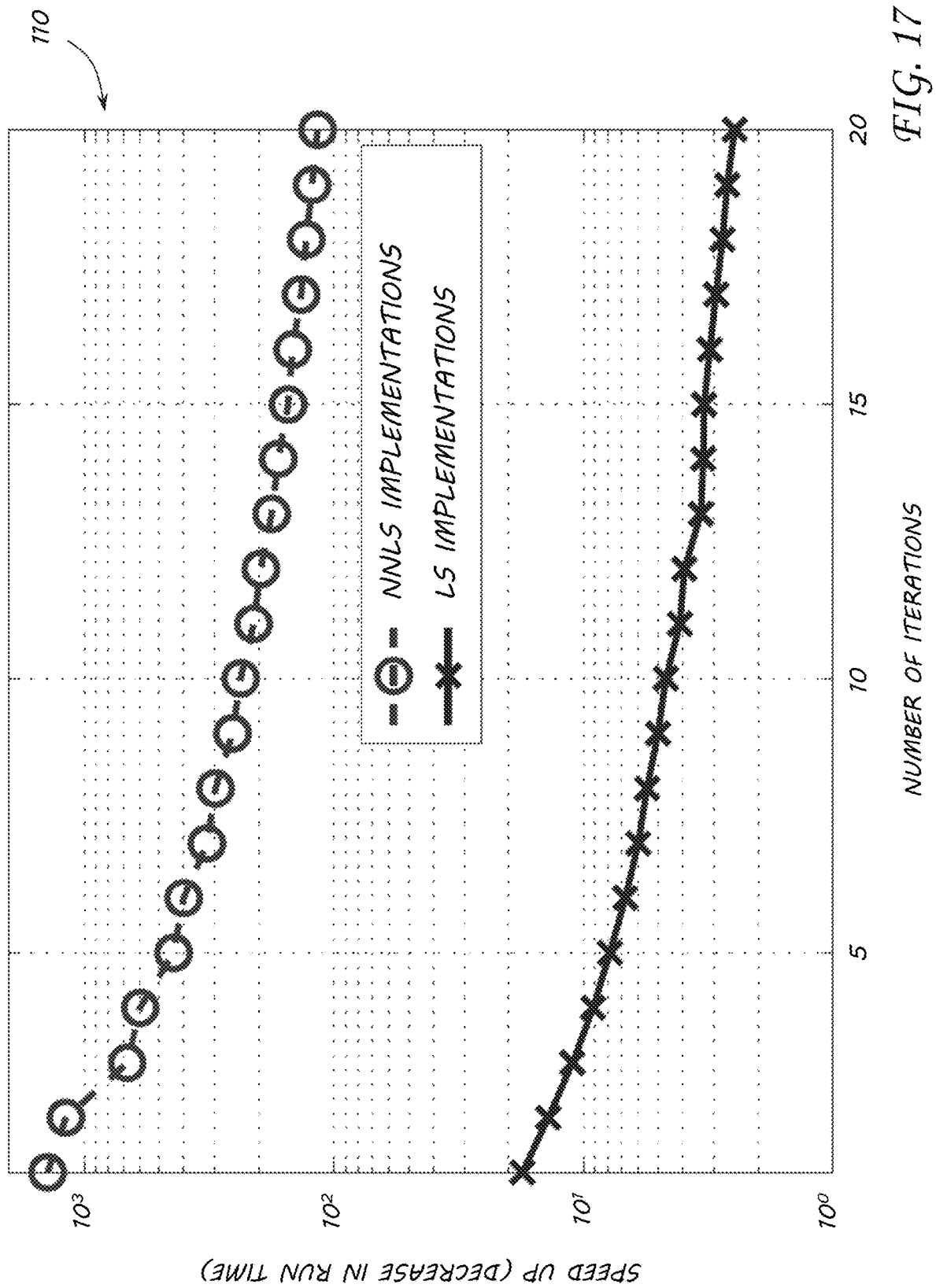
FIG. 17 contains a graph illustrating runtime improvement for the radio tomographic imaging environment of FIGS. 15A-15D.

Graph 110 in FIG. 17 shows the speed improvement factor of the provincial algorithm relative to the standard approach, as a function of the number of iterations of the provincial approach. In absolute terms, the runtimes were 13.1 s for LS, 9.92 hours for NNLS, 0.741 s for PLS:4, and 59.8 s for PNNLS:4, on a four-year-old desktop computer running MATLAB® 2012a. Note that a full standard NNLS solution is not viable for real-time imagery, but the PNNLS method utilized by embodiments of the invention could conceivably be implemented in real time on the right platform.

Figure 18:
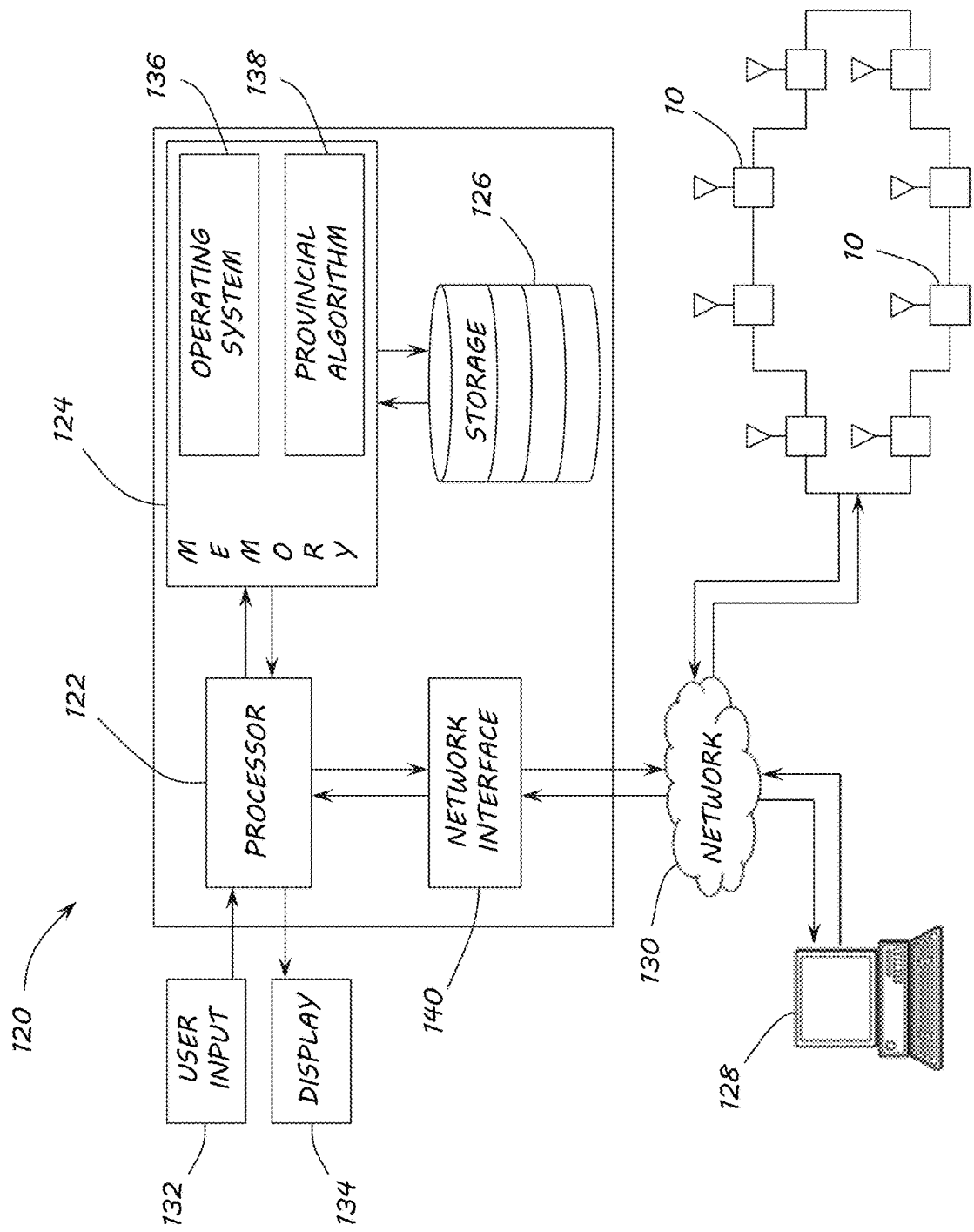
FIG. 18 is a schematic diagram of an exemplary hardware and software environment for radio tomographic imaging consistent with embodiments of the invention.

As such, embodiments of the invention may be implemented on numerous hardware platforms. FIG. 18 illustrates an exemplary hardware and software environment for a control apparatus 120 suitable for generating radio tomographic images consistent with the invention. For the purposes of embodiments of the invention, control apparatus 120 may represent practically any computer, computer system, or programmable device, e.g., multi-user or single-user computers, desktop computers, portable computers and devices, handheld devices, network devices, mobile phones, etc. Control apparatus 120 will hereinafter be referred to as a "computer" although it should be appreciated that the term "apparatus" may also include other suitable programmable electronic devices.

Computer 120 typically includes at least one processor 122 coupled to a memory 124. Processor 122 may represent one or more processors (e.g. microprocessors), and memory 124 may represent the random access memory (RAM) devices comprising the main storage of computer 120, as well as any supplemental levels of memory, e.g., cache memories, non-volatile or backup memories (e.g. programmable or flash memories), read-only memories, etc. In addition, memory 124 may be considered to include memory storage physically located elsewhere in computer 120, e.g., any cache memory in a processor 122, as well as any storage capacity used as a virtual memory, e.g., as stored on a mass storage device 126 or another computer coupled to computer 128 via a network 130. The mass storage device 126 may contain a cache or other data, such as the W, $D_H$, and $D_V$ matrices, for example.

Computer 120 also typically receives a number of inputs and outputs for communicating information externally. For interface with a user or operator, computer 120 typically includes one or more user input devices 132 (e.g., a keyboard, a mouse, a trackball, a joystick, a touchpad, a keypad, a stylus, and/or a microphone, among others). Computer 120 may also include a display 134 (e.g., a CRT monitor, an LCD display panel, and/or a speaker, among others). The interface to computer 120 may also be through an external terminal connected directly or remotely to computer 120, or through another computer 128 communicating with computer 120 via a network 130, modem, or other type of communications device. Additionally, computer 120 may receive link data from transceivers 10 through the network 90.

Computer 120 operates under the control of an operating system 136, and executes or otherwise relies upon various computer software applications, components, programs, objects, modules, data structures, etc. (e.g. provincial algorithm 138). Computer 120 communicates on the network 130 through a network interface 140.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to non-transitory physical, recordable type media such as volatile and non-volatile memory devices, floppy and other removable disks, hard disk drives, optical disks (e.g., CD-ROM's, DVD's, etc.), among others; and transmission type media such as digital and analog communication links.

In addition, various program code described may be identified based upon the application or software component within which it is implemented in specific embodiments of the invention. However, it should be appreciated that any particular program nomenclature used is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 18 is not intended to limit the present invention. Indeed, those skilled in the art will recognize that other alternative hardware and/or software environments may be used without departing from the scope of the invention.

Embodiments of the invention implement a new algorithm for tomographic imaging. The new algorithm behaves similarly to the contemporary approaches, and has the additional benefit of a noise suppression effect that makes it easier to isolate the locations of individuals or other objects in the imaging area. The standard and new algorithms were also extended to non-negative least squares implementations, which further suppresses noise at the expense of increasing the runtime. However, the computational savings from the new approach utilized with embodiments of the invention cancels out this increase in runtime, making the PNNLS implementation possible in near real time, in contrast to the vastly impractical runtime of the NNLS implementation. Performance was demonstrated on both simulated and experimental data, and the provincial approach produced subjectively better imagery in about 1 to 3 orders of magnitude less runtime.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method for generating radio tomographic images from a plurality of transceivers positioned around a region to be imaged, the method comprising:
dividing the region into a plurality of pixels;
causing each of the plurality of transceivers in turn to send a signal to each of the other transceivers of the plurality of transceivers;
determining if there is an attenuation in the signal received by each of the other transceivers of the plurality of transceivers;
generating a weighing matrix W, derivative matrices DH and $D_V$, and attenuation matrix y from the signals received by each of the plurality of receivers;
partitioning the region into a plurality of provinces each containing a unique set of pixels of the plurality of pixels;
selecting each province of the plurality of provinces in turn and solving for a change in attenuation in each of the pixels in the province while setting the pixels in the other provinces of the plurality of provinces to zero;
aggregating solutions from each of the plurality of provinces into a rough estimate;
re-solving each province of the plurality of provinces for the change in attenuation in each of the pixels in the province using the aggregated rough estimate;
aggregating re-solved solutions from each of the plurality of provinces into a refined estimate; and
generating an image from the refined estimate.

2. The method of claim 1, further comprising:
determining a baseline RSS for each of the signals sent and received by transceivers of the plurality of transceivers; and
determining the change in attenuation in the signals received by each of the transceivers of the plurality of transceivers by determining if the RSS drops below the determined baseline RSS.

3. The method of claim 2, wherein solving for a change in attenuation in each of the pixels in the province includes forward and back substitution matrix operations.

4. The method of claim 2, wherein solving for a change in attenuation in each of the pixels in the province includes forward substitution and non-negative least squares matrix operations.

5. The method of claim 2, wherein solving for a change in attenuation in each of the pixels in the province includes extracting relevant rows and columns from W, DH, and $D_V$ for the province.

6. The method of claim 1, further comprising:
re-solving each province of the plurality of provinces for the change in attenuation in each of the pixels in the province using the aggregated refined estimate;
aggregating re-solved solutions from each of the plurality of provinces into a further refined estimate; and
generate an image from the refined estimate.

7. The method of claim 6, further comprising:
repeating the re-solve and aggregate steps to further refine the estimate until a stopping criteria is met.

8. The method of claim 1 wherein a control apparatus is in communication with the plurality of transceivers, and the control apparatus carries out the steps of the method subsequent to the step of dividing the region into a plurality of pixels.

9. The method of claim 1 further comprising a step of using the image generated to determine when a person or object enters the region.

10. A method for generating radio tomographic images from a plurality of transceivers positioned around a region to be imaged, the method comprising:
dividing the region into a plurality of pixels;
providing a control apparatus that is in communication with the plurality of transceivers, and using the control apparatus to:
cause each of the plurality of transceivers in turn to send a signal to each of the other transceivers of the plurality of transceivers;
determine if there is an attenuation in the signal received by each of the other transceivers of the plurality of transceivers;
generate a weighing matrix W, derivative matrices DH and $D_V$, and attenuation matrix y from the signals received by each of the plurality of transceivers;
partition the region into a plurality of provinces each containing a unique set of pixels of the plurality of pixels;
select each province of the plurality of provinces in turn and solve for a change in attenuation in each of the pixels in the province while setting the pixels in the other provinces of the plurality of provinces to zero;
aggregate solutions from each of the plurality of provinces into a rough estimate;
re-solve each province of the plurality of provinces for the change in attenuation in each of the pixels in the province using the aggregated rough estimate;
aggregate re-solved solutions from each of the plurality of provinces into a refined estimate; and
generate an image from the refined estimate.

11. The method of claim 10 further comprising, in the step of dividing the region into a plurality of pixels, initially providing a plurality of transceivers positioned around a region to be imaged.

\* \* \* \* \*